(12) United States Patent
Aridome et al.

(10) Patent No.: US 7,363,333 B2
(45) Date of Patent: Apr. 22, 2008

(54) RECORDING METHOD, RECORDING APPARATUS, AND RECORDING MEDIUM

(75) Inventors: Kenichiro Aridome, Kanagawa (JP); Makoto Yamada, Tokyo (JP); Hirofumi Todo, Tokyo (JP)

(73) Assignee: Sony Corporation, Tokyo (JP)

( * ) Notice: Subject to any disclaimer, the term of this patent is extended or adjusted under 35 U.S.C. 154(b) by 623 days.

(21) Appl. No.: 10/333,553

(22) PCT Filed: May 23, 2002

(86) PCT No.: PCT/JP02/04993

§ 371 (c)(1),
(2), (4) Date: Jan. 22, 2003

(87) PCT Pub. No.: WO02/095751

PCT Pub. Date: Nov. 28, 2002

(65) Prior Publication Data

US 2003/0177138 A1 Sep. 18, 2003

(30) Foreign Application Priority Data

| May 24, 2001 | (JP) | ............................. 2001-155856 |
| May 29, 2001 | (JP) | ............................. 2001-161225 |
| Jun. 19, 2001 | (JP) | ............................. 2001-185583 |

(51) Int. Cl.
*G06F 17/30* (2006.01)
*G06F 12/00* (2006.01)

(52) U.S. Cl. .......................... 707/205; 707/200; 711/4
(58) Field of Classification Search ................ 707/205; 711/4; 369/30.04, 99
See application file for complete search history.

(56) References Cited

U.S. PATENT DOCUMENTS

| 5,682,497 A * | 10/1997 | Robinson ..................... 711/103 |
| 2003/0076764 A1 * | 4/2003 | Iwano et al. .................. 369/99 |

FOREIGN PATENT DOCUMENTS

| JP | 3-86975 | 4/1991 |
| JP | 6-223536 | 8/1994 |
| JP | 11-86450 | 3/1999 |
| JP | 2001-243724 | 9/2001 |
| JP | 2001-249838 | 9/2001 |

* cited by examiner

*Primary Examiner*—Joon Hwan Hwang
(74) *Attorney, Agent, or Firm*—Frommer Lawrence & Haug LLP; William S. Frommer; Thomas F. Presson

(57) ABSTRACT

The present invention is a recording method for recording data to a disc shaped record medium 10 corresponding to a hierarchical file system, the method comprising the steps of recording management information for managing a hierarchical structure of the file system to a particular area 16 of the disc shaped record medium, treating an unused area of the particular area 16 as a particular file, and recording information with respect to an initial location and an initial length of the particular file and information with respect to a current location and a current length of the particular file to the particular area 16.

6 Claims, 20 Drawing Sheets

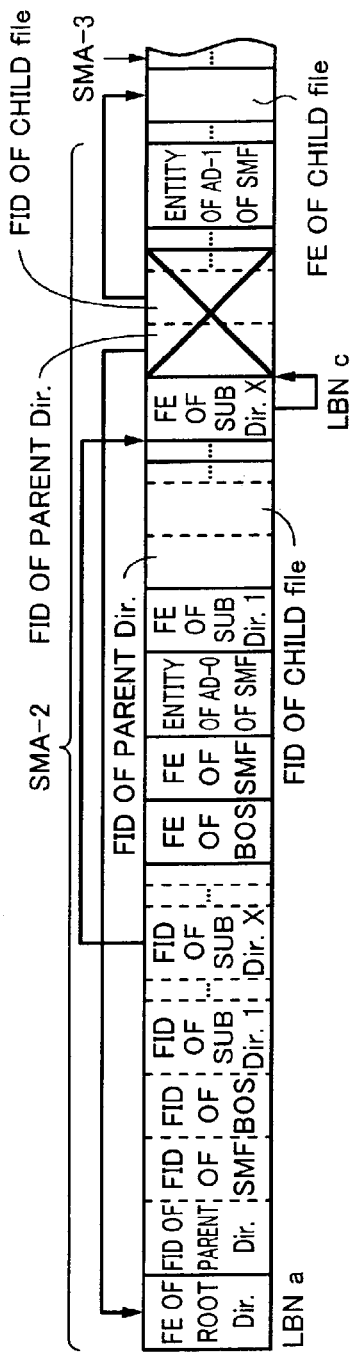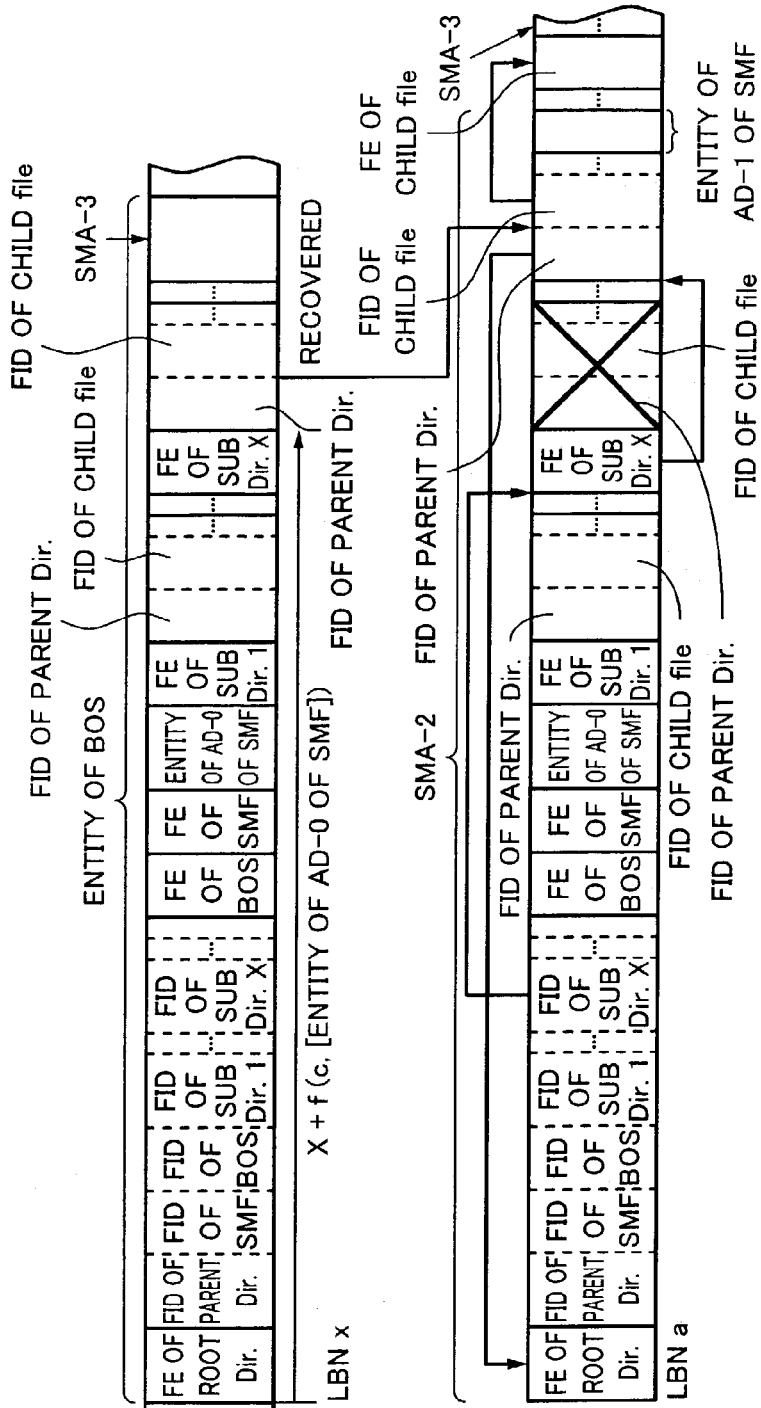
Fig. 15A  Fig. 15B  Fig. 15C

Fig. 17

FILE IDENTIFIER DESCRIPTORS

| BP | LENGTH | NAME | TYPE |
|---|---|---|---|
| 0 | 16 | Descriptor Tag | tag |
| 16 | 2 | File Version Number | Uint16 |
| 18 | 1 | File Characteristics | Uint8 |
| 19 | 1 | Length Of File Identifier (L_FI) | Uint8 |
| 20 | 16 | ICB | long_ad |
| 36 | 2 | Length Of Implementation Use (L_IU) | Uint16 |
| 38 | L_IU | Implementation Use [] | byte |
| 38 + L_IU | L_FI | File Identifier [] | d-character |
| 38 + L_IU + L_FI | | Padding [] | byte |

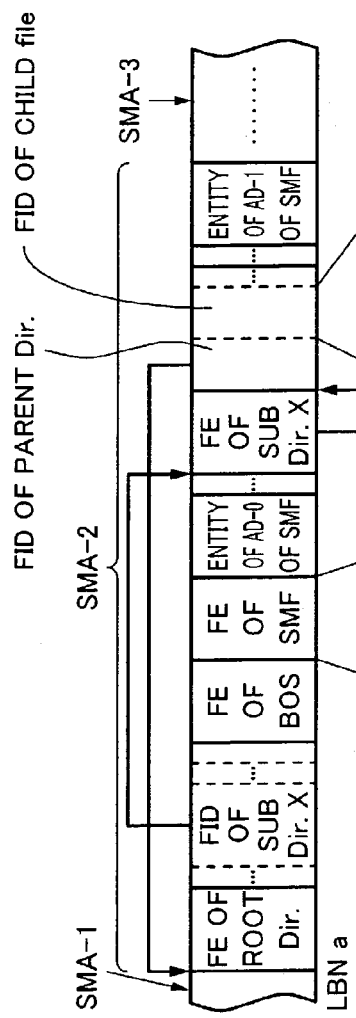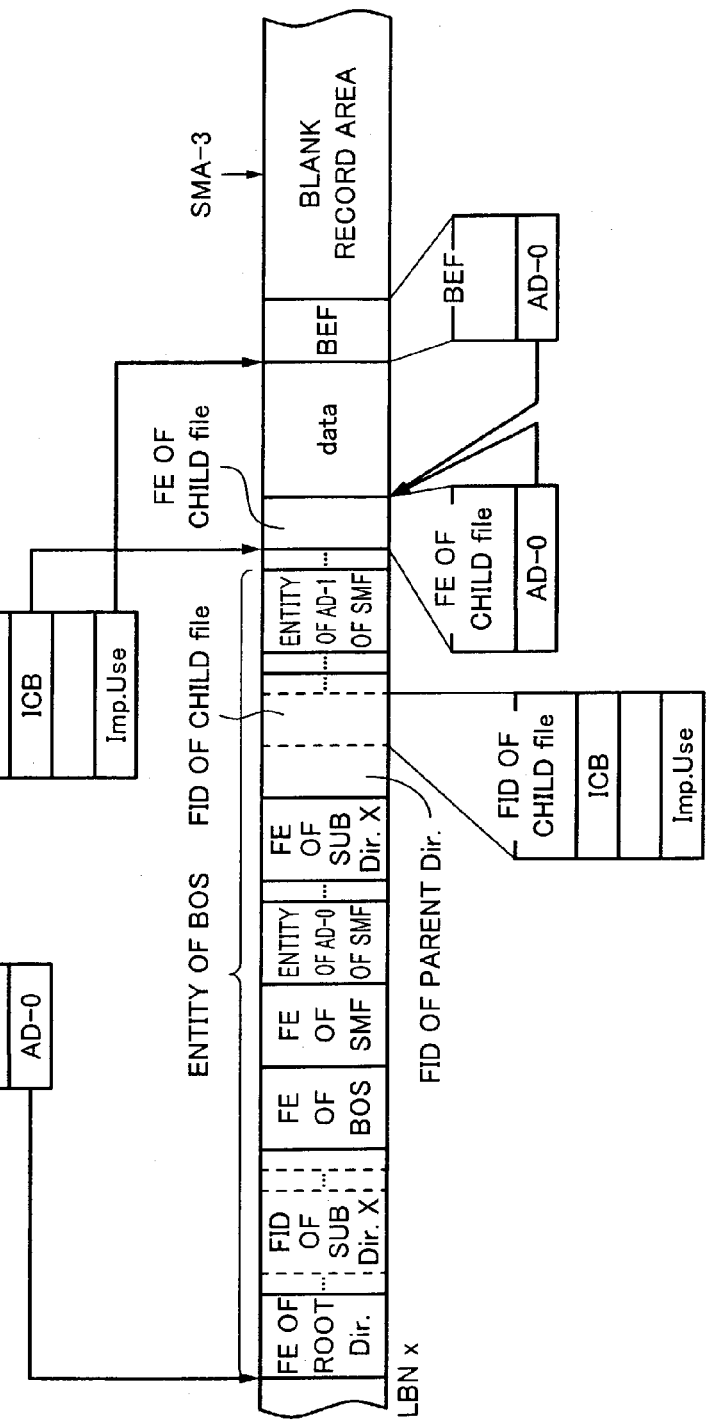
Fig. 18A
Fig. 18B

Fig. 19

IMPLEMENTATION USE FORMAT

| RBP | LENGTH | NAME | TYPE |
|-----|--------|------|------|
| 0 | 1 | Flags | Uint8 |
| 1 | 23 | Identifier | byte |
| 24 | 1 | OS Class | Uint8 |
| 25 | 1 | OS Identifier | Uint8 |
| 26 | 6 | Implementation Use Area | byte |
| 32 | 4 | Logical Block Number of Backup BFE | Uint32 |

US 7,363,333 B2

RECORDING METHOD, RECORDING APPARATUS, AND RECORDING MEDIUM

TECHNICAL FIELD

The present invention relates to a recording method for recording data on a rewritable record medium, in particular, to a recording method that allows hierarchical structure management information for a file system and information that represents a record location of entity data of a file to be recovered when these information gets defective. In addition, the present invention relates to a recording method that allows a drive apparatus to recognize a file structure at high speed when data is added. Moreover, the present invention relates to a recording apparatus that uses the recording method and a record medium on which data has been recorded corresponding to the recording method.

BACKGROUND ART

In recent years, high density optical discs typified by DVDs (Digital Versatile Discs) have been progressively developed and standardized. To absorb as many different physical record formats of various types of mediums as possible and provide a logical structure of an information storage unit that has a higher commonality in applications, UDF (Universal Disk Format) was established. A rewritable DVD-RAM (DVD-Random Access Memory) uses a logical format corresponding to the UDF. In addition, the UDF can be applied to a one-time writable CD-R and a rewritable CD-RW.

The UDF is structured with a hierarchical file system. In the UDF, with information stored under a root directory, a sub directory and an entity file are referenced. In addition, with information stored in a sub directory, another sub directory and an entity file are referenced. Hereinafter, a directory is abbreviated as "Dir.".

In other words, a record area on a disc is accessed as sectors. A sector is the minimum unit of storage. On a DVD-RAM, the disc is accessed from the inner periphery side to the outer periphery side. From the innermost periphery side, a lead-in area is formed. The lead-in area is followed by a system area. In the system area, volume information is written. As the volume information, VRS (Volume Recognition Sequence), MVDS (Main Volume Descriptor Sequence), LVIS (Logical Volume Integrity Sequence), and AVDP (Anchor Volume Descriptor Pointer) are written.

The location of a record area at which a file entry (hereinafter abbreviated as "FE") of the root Dir. is recognized by successively referencing the AVDP, the MVDS, and the FSD. An FE is composed of attribute information for a file or a directory and an allocation descriptor (hereinafter abbreviated as "AD"). An AD is information of a logical address of a file or a directory and a size (length). An AD represents a record area at which entity data of a file is recorded or a record area at which an entity of a directory is recorded.

At the FE of the root Dir., the AD represents a logical address and a length of an entity of the root Dir. The root Dir. contains at least one file identifier descriptor (hereinafter abbreviated as "FID"). With an FID, an FE of a sub directory or an FE of a file under the root directory is referenced. With these FEs, the entity of the corresponding sub Dir. and the entity of the file are referenced by respective ADs. In addition, an entity of a sub Dir. may contain at least one FID. In other words, in the UDF, except for the root Dir., with FIDs and FEs as pointers, the FIDs, FEs, and entities are successively accessed and recognized. In the UDF, FIDs, FEs, and entities can be written any recordable areas.

For example, on the innermost periphery of a disc, the lead-in area is formed. On the outer periphery of the lead-in area, a system area is formed. The entity of the root Dir. is formed for example on the outer periphery of the system area.

Next, the case that a file is accessed from the root Dir. through a sub Dir. will be described. Corresponding to the FID of the entity of the root Dir., an FE of the sub Dir., the FE being at an address physically apart from the entity of the root Dir., is referenced. Likewise, corresponding to an AD of an FE of the sub Dir., the entity of the sub Dir., the entity being at an address apart from the FE of the sub Dir., is referenced. Likewise, the FID of the entity of the sub Dir. is referenced. An FE of the file, the FE being at an address apart from the entity of the sub Dir., is referenced. With an AD of the FE of the file, the entity of the file, the entity being at an address apart from the FE of the file, is referenced.

Thus, conventionally, when information of directories and files is dispersed on a disc, it takes a long time to read these information. To solve such a problem, it is possible to collectively record pointer information such as FIDs and FEs at a predetermined area of a disc.

However, in such a case, if a file is deleted from a disc, since a corresponding FE and so forth are deleted, blank addresses take place. In this case, a file may be written to a blank address. As a result, pointer information that has been collectively written to the predetermined area may be separated. As a result, it may take a long time to read information of directories and files.

In addition, while the disc is being used, if any defect takes place in hierarchical structure management information for a file system, the management information being composed of pointer information such as FIDs and FEs, the drive apparatus cannot read the management information. In addition, while the disc is being used, if any defect takes place in an FE of a file, the FE representing a record area (location) of entity data of the file, the drive apparatus cannot read the FE of the file. In such a case, even if any defect does not take place in entity data of moving picture data or audio data, since the drive apparatus cannot read the management information or the FE of the file, the drive apparatus cannot access the entity data.

DISCLOSURE OF THE INVENTION

Therefore, a first object of the present invention is to provide a recording method that allows a file to be accessed always at high speed without a separation of pointer information and an area for the pointer information to be recognized.

A second object of the present invention is to provide a recording method for recording management information as a file to a record medium so that when a defect takes place in the management information, with reference to the file, the management information can recovered.

A third object of the present invention is to provide a recording method for backing up an FE of a file so that when any defect takes place in the FE of the file, with reference to the backup FE, the FE of the file can be recovered.

A fourth object of the present invention is to provide a recording apparatus and a record medium using these recording methods.

The present invention is a recording method for recording data to a disc shaped record medium corresponding to a hierarchical file system, the method comprising the steps of recording management information for managing a hierarchical structure of the file system to a particular area of the disc shaped record medium, treating an unused area of the particular area as a particular file, and recording information with respect to an initial location and an initial length of the particular file and information with respect to a current location and a current length of the particular file to the particular area.

The present invention is a recording apparatus that records data to a disc shaped record medium corresponding to a hierarchical file system, the apparatus comprising a means for recording management information for managing a hierarchical structure of the file system to a particular area of the disc shaped record medium, a means for treating an unused area of the particular area as a particular file, and a means for recording information with respect to an initial location and an initial length of the particular file and information with respect to a current location and a current length of the particular file to the particular area.

The present invention is a disc shaped record medium on which data is recorded corresponding to a hierarchical file system, management information for managing a hierarchical structure of the file system being recorded to a particular area of the disc shaped record medium, an unused area of the particular area being treated as a particular file, information with respect to an initial location and an initial length of the particular file and information with respect to a current location and a current length of the particular file being recorded to the particular area.

Thus, according to the present invention, when data is recorded to a disc shaped record medium corresponding to a hierarchical file system, management information for managing a hierarchical structure of the file system is recorded to a particular area of the disc shaped record medium and an unused area of the particular area is treated as a particular file. Thus, an area to which the management information for managing the hierarchical structure of the file system is added is securely allocated. Consequently, the hierarchical structure of the file system can be read at high speed. Thus, the reproduction start time can be remarkably reduced in comparison with the conventional method.

In addition, according to the present invention, since information with respect to an initial location and an initial length of a particular file and information with respect to a current location and a current length of the particular file are recorded in a particular area, a location and a length of the particular area can be securely recognized.

The present invention is a recording method for recording data to a record medium corresponding to a hierarchical file system, the method comprising the steps of recording management information for managing a hierarchical structure of the file system to a particular area of the record medium, treating an unused area of the particular area as a particular file, copying all the particular area to another area as it is and treating all the copied particular area as one backup file, and if a part of the management information cannot be read, reducing a length of the particular file, creating a blank portion of the particular area, and recovering the part of the management information that cannot be read with data corresponding to the part of the backup file in the blank portion of the particular area.

The present invention is a recording apparatus that records data to a record medium corresponding to a hierarchical file system, the apparatus comprising a means for recording management information for managing a hierarchical structure of the file system to a particular area of the record medium, a means for treating an unused area of the particular area as a particular file, a means for copying all the particular area to another area as it is and treating all the copied particular area as one backup file, and a means for reducing a length of the particular file, creating a blank portion of the particular area, and recovering a part of the management information that cannot be read with data corresponding to the part of the backup file in the blank portion of the particular area, if the part of the management information cannot be read.

In the recording method and the recording apparatus, since original management information can be recovered with a backup file, even if a defect takes place in a part of the management information, entity data recorded on a record medium can be securely reproduced. In addition, since data to be recovered is placed in a particular area for the original management information, after the recovery, the management information can be collectively placed in the particular area. Thus, after the recovery, the hierarchical structure of the file system can be read at high speed. As a result, the reproduction start time can be remarkably reduced in comparison with the conventional method.

The present invention is a recording method for recording data to a record medium corresponding to a hierarchical file system, the method comprising the steps of recording management information for managing a hierarchical structure of the file system to a particular area of the record medium, treating an unused area of the particular area as a particular file, dually recording information that designates a record location of entity data of a file as regular information and backup information to the record medium, and reducing a length of the particular file, creating a blank area of the particular area, and recording designation information that designates record locations of the regular information and the backup information to the blank area of the particular area.

The present invention is a recording apparatus that records data to a record medium corresponding to a hierarchical file system, the apparatus comprising a means for recording management information for managing a hierarchical structure of the file system to a particular area of the record medium, a means for treating an unused area of the particular area as a particular file, a means for dually recording information that designates a record location of entity data of a file as regular information and backup information to the record medium, and a means for reducing a length of the particular file, creating a blank area of the particular area, and recording designation information that designates record locations of the regular information and the backup information to the blank area of the particular area.

In the recording method and the recording apparatus, since information that designates a location of entity data of a file is dually recorded, the security of the information can be improved.

In addition, according to the present invention, when regular information cannot be read due to an occurrence of a defect, using backup information, the regular information can be newly recovered to the record medium. Thus, even if the regular information cannot be read, entity data of a file can be read. In addition, whenever regular information cannot be read, it is recovered with backup information. Thus, unless both the regular information and the backup information cannot be read, entity data of a file can be read.

According to the present invention, the recording method further comprises the steps of copying all the particular area to another area as it is and treating all the copied particular area as one backup file, and if a part of the management information cannot be read, reducing a length of the particular file, creating a blank portion of the particular area and recovering the part of the management information that cannot be read with data corresponding to the part of the backup file in the blank portion of the particular area.

In the recording method, since original management information can be recovered with a backup file, even if a defect takes place in a part of the management information, entity data recorded on a record medium can be securely reproduced. In addition, since data to be recovered is placed in a particular area for the original management information, after the recovery, the management information can be collectively placed in the particular area. Thus, after the recovery, the hierarchical structure of the file system can be read at high speed. As a result, the reproduction start time can be remarkably reduced in comparison with the conventional method.

According to the present invention, the recording method further comprises the step of recording information with respect to an initial location and an initial length of the particular file and information with respect to a current location and a current length of the particular file to the particular area.

In the recording method, since information with respect to an initial location and an initial length of the particular file and information with respect to a current location and a current length of the particular file is recorded to the particular area, a location and a length of the particular area can be securely recognized.

BRIEF DESCRIPTION OF DRAWINGS

FIG. 15 is a schematic diagram for explaining a process for recovering an entity of a sub Dir. in the case that a defect has taken place in the entity of the Sub Dir. according to the second embodiment;

FIG. 17 is a schematic diagram showing a file identifier descriptor according to the third embodiment;

FIG. 18 is a schematic diagram for explaining a creation of a backup of a file entry of a child file according to the third embodiment;

FIG. 19 is a schematic diagram showing a format of an implementation use according to the third embodiment.

BEST MODES FOR CARRYING OUT THE INVENTION

Figure 1:
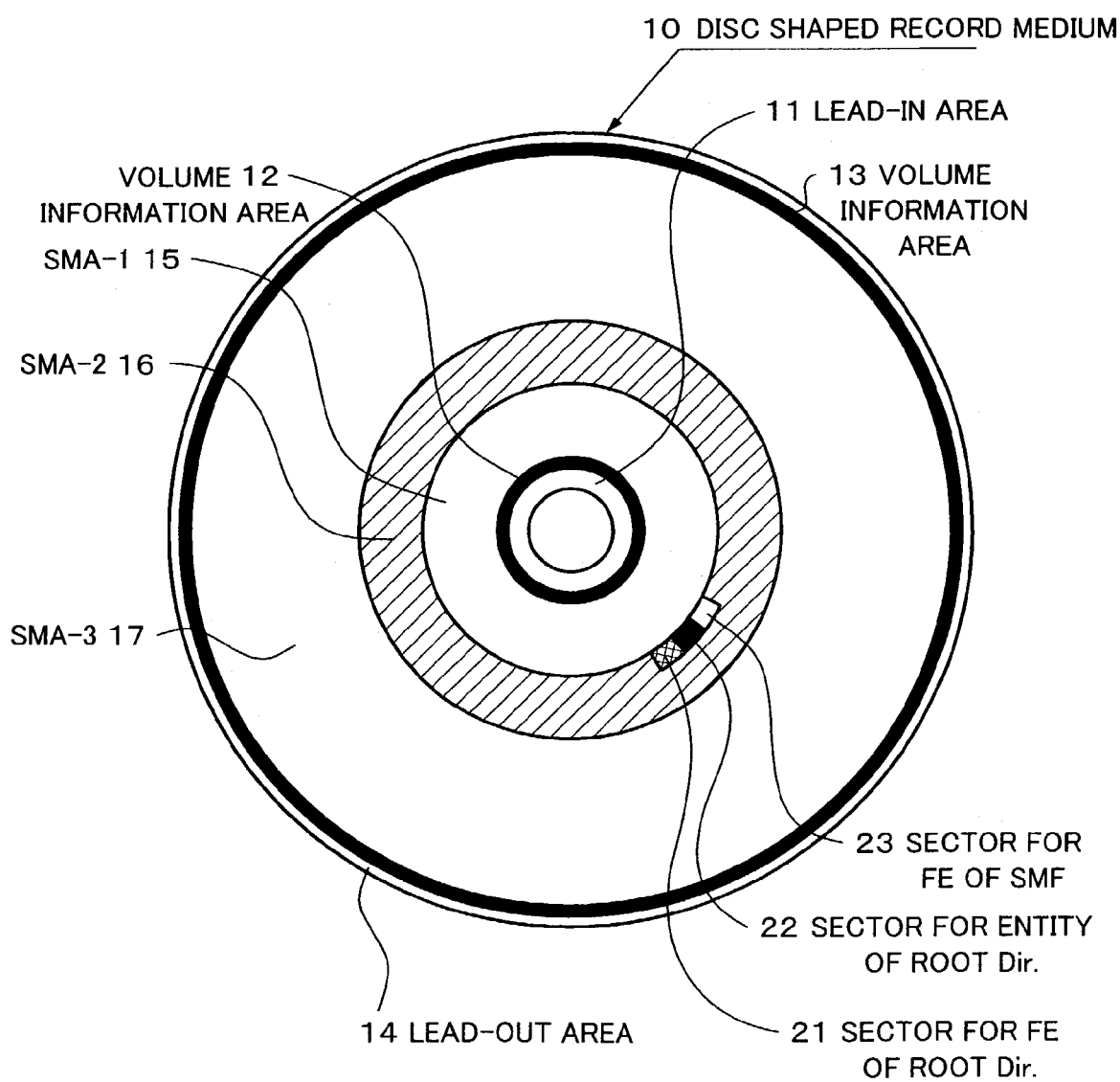
FIG. 1 is a schematic diagram showing the relation between a logical format of a disc shaped record medium and the disc shape thereof.

Next, with reference to the accompanying drawings, embodiments of the present invention will be described. In each drawing, similar structure is denoted by similar reference numeral.

First Embodiment

According to a first embodiment of the present invention, management information is collectively recorded in a predetermined area. Thus, even if data is added or deleted, a drive apparatus can recognize a file structure at high speed.

FIG. 1 is a schematic diagram showing the relation between a logical format of a disc shaped record medium and the disc shape thereof.

Figure 2:
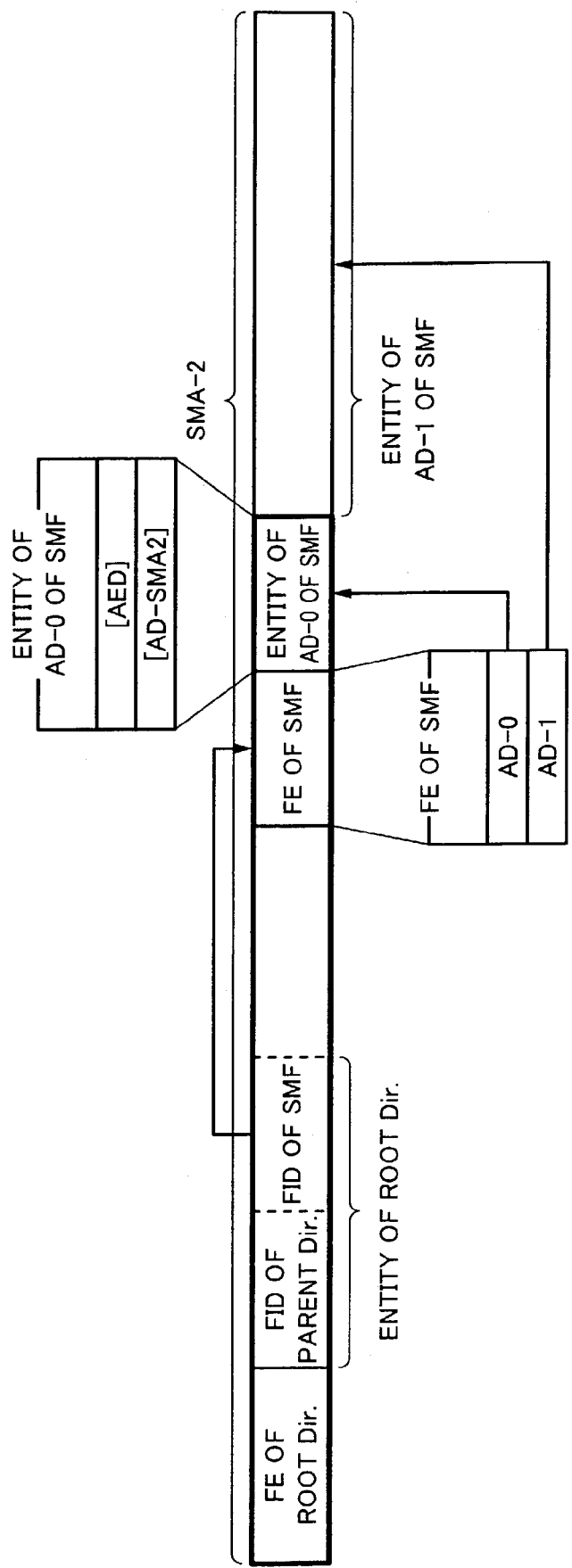
FIG. 2 is a schematic diagram for explaining a method for creating an SMF in an SMA-2 area according to a first embodiment of the present invention.

FIG. 2 is a schematic diagram for explaining a method for creating an SMF in an SMA-2 area according to the first embodiment.

In FIG. 1, a logical format of a disc shaped record medium 10 is based on UDF (Universal Disk Format). On the disc shaped record medium 10, a lead-in area 11 is formed on the innermost periphery thereof. On the outer periphery of the lead-in area 11, logical sector numbers (hereinafter abbreviated as LSNs) are assigned. A volume information area 12, an SMA (Space Management Area)-1 area 15, an SMA-2 area 16, an SMA-3 area 17, and a volume information area 13 are successively formed. On the outermost periphery, a lead-out area 14 is formed. The logical sector number of the beginning sector of the volume information area 12 is "0" as a reference sector. On the other hand, logical block numbers (hereinafter abbreviated as "LBNs") are assigned to the SMA-1 area 15 to the SMA-3 area 17 in such a manner that the logical block number of the beginning sector of the SMA-1 area is "0" as a reference block.

Corresponding to the prescription of the UDF, the VRS, the MVDS, and the LVIS are written in the volume information area 12. At LSN 256 of the volume information area 12, the AVDP is placed. In addition, the AVDP is written to a sector having the last logical sector number and a sector having (last logical sector number—256). The content of the MVDS is written as an RVDS (Reserve Volume Descriptor Sequence) twice in the volume information area 13 on the inner periphery of the lead-out area 14.

A partition area is formed between sectors having logical sector number 272 and (last logical sector number—272). The SMA-1 area 15 to the SMA-3 area 17 are formed in the partition area. Corresponding to the prescription of the UDF, the SMA-1 area 15 formed on the innermost periphery side of the partition area is composed of an FSDS (File Set Descriptor Sequence) and an SBD (Space Bitmap Descriptor). The FSDS is composed of an FSD (File Set Descriptor) and a TD (Terminating Descriptor). The SBD contains information that represents the entire blank areas of the disc shaped record medium 10. A blank area of each sector is represented with a flag. The FSD represents a logical address and a length of an FE (File Entry) against the root Dir. in the hierarchical structure of the file system.

In FIGS. 1 and 2, the SMA-2 area 16 is an area in which the FE of the root Dir., the entity of the root Dir., an FE of an SMF (Space Management File), and an entity of the SMF are placed. As will be described later, when a required amount of the entity of the SMF is reduced, an FE of a sub Dir. and an entity of the sub Dir. that contains an FID that represents a file are placed in the SMA-2 area 16. In other words, the FID and the FE of the directory are collectively recorded in the SMA-2 area 16.

The SMF is composed of two entities. The two entities are represented by AD-0 and AD-1 in the FE of the SMF. The first entity of the SMF is an area that describes information of a location (logical address) and a length of an area that has been initially allocated as the second entity of the SMF. In FIG. 2, the first entity of the SMF is an area denoted by the AD-0. As will be described later, the second entity of the SMF is an area allocated for an FID and an FE of a directory created while data is recorded on the disc shaped record medium 10 after a format process has been performed. In FIG. 2, the second entity of the SMF is an area represented by the AD-1.

Thus, since the SMF is divided into two entities and information of an initial location and an initial length of the second entity are described in the first entity, regardless of a location at which the FE of the SMF has been recorded and a location at which the FE of the root Dir. has been recorded, the SMA-2 area 16 can be defined. In addition, as will be described later, with the two entities of the SMA, after a sub Dir. and a file under the root directory have been deleted, the drive apparatus can flexibly operate.

In the SMF, when a format process is performed, an unused area of the SMA-2 area 16 is allocated as a file that has a predetermined capacity and to which a predetermined attribute has been added. Since an unused area of the SMA-2 area 16 is treated as a file, with the forgoing SBD, the unused area can be prevented from being recognized as a blank area.

The FE of the root Dir., the entity of the root Dir., and the FE of the SMF can be placed at any sectors of the SMA-2 area 16. However, to access them at high speed, as shown in FIG. 1, it is preferred to successively record them. Of course, one object of the present invention of which the drive apparatus recognizes at high speed a sector for information recorded on the disc shaped record medium 10 can be accomplished with the SMF.

As was described in the foregoing Related Art section, an FE represents a location and a length of an entity of a file or a directory. An AD of the FE describes these information. An FID represents a location and a length of an FE with a name of a file or a directory and an ICB (Information Control Block) of the FID.

The SMA-3 area 17 is an area for an FE of a file and data of the file. In the SMA-3 area 17, it is preferred to successively place an FE of a file and data of the file corresponding thereto at adjacent addresses. When a file is added, it is preferred to successively place an FE of the file to be added and an existing file at adjacent addresses. In addition, it is preferred to successively place data of the file and the FE thereof at adjacent addresses. When an FE of a file and data thereof are successively placed at adjacent addresses, the file can be accessed at high speed.

Next, an example of a method for formatting the disc shaped record medium 10 will be described. It is assumed that the lead-in area 11 and the lead-out area 14 have been created in a press process of a fabrication process of the disc shaped record medium 10. In other words, it is assumed that before a format process has been performed, the lead-in area 11 and the lead-out area 14 have been formed. The format process is performed from the inner periphery side to the outer periphery side of the disc shaped record medium 10.

When the format process is started, the AVDP is written to a plurality of predetermined addresses. The forgoing VRS, MVDS, and LVIS are written from the outer periphery of the lead-in area 11.

Next, a partition is created. In the partition, the SMA-1 area 15 is created. The FSD is written to the SMA-1 area 15. The location of the root Dir. is decided. Next, the SBD is created. At that point, the area of the SBD is treated as a used area. As a result, an area of the SMF is allocated.

After the SBD and the SMA-1 area 15 have been created, the SMA-2 area 16 is created from the outer periphery of the SMA-1 area 15.

When the SMA-1 area 15 is created, corresponding to the FSD written to the SMA-1 area 15, a sector for an FE of a root Dir. and a sector for an entity of the root Dir. are successively allocated at predetermined adjacent addresses. The FE of the root Dir. and the entity of the root Dir. are written to these addresses.

The entity of the root Dir. is composed of an FID of a parent Dir. and an FID of an SMF. The FID of the SMF designates a location of the FE of the SMF.

At that point, an attribute of the SMF is designated in the FID. The designated attribute of the SMF prevents another apparatus or an OS (Operating System) from deleting, rewriting, or moving the SMF. For example, "hidden file attribute" is designated as an attribute of the SMF. The "hidden file attribute" is an attribute that prevents a file therewith from being browsed in a normal manner.

Next, the FE of the SMF is created. When a format process is performed, the FE of the SMF is composed of the AD-0 that designates an address and a length of a file of a first entity and the AD-1 that designates an address and a length of a file of a second entity. Thus, with the FE designated, these files are created. The files can be used as dummy files. In the FE of the SMF, "read only file attribute" and "system file attribute" are designated.

The "read only file attribute" is an attribute that represents that a file therewith is a read only file and that the system prohibits the file therewith from being changed or deleted.

The "system file attribute" is an attribute that represents that a file therewith is a file required by the system. When all these three attributes are designated to the SMF, unless it is intentionally operated, it cannot be deleted, rewritten, or moved. These attributes can be canceled by a known method.

Thereafter, a first entity of the SMF is created in a sector adjacent to the sector for the entity of the root Dir. An initial location and an initial length of the second entity of the SMF are described in the first entity of the SMF. In other words, the location and the length of the second entity of the SMF that has been allocated in the format process are described in the first entity of the SMF. This format is described as AD corresponding to the UDF. In the specification, a pseudo AD is denoted by [AD]. FIG. 2 shows [AD-SMA2]. As will be described later, there is a possibility of which the second entity of the SMF is extended so that there are a plurality of [AD]. To represent the number of [AD], corresponding to the prescription of the UDF, an AED (Allocation Extended Descriptor) is used. In the specification, the pseudo AED is denoted by [AED].

In such a manner, since the SMF is placed in the SMA-2 area 16, a blank area of the SMA-2 area 16 can be allocated by the SMF. After a format process is performed, when an FE of a sub Dic. and an entity thereof are written, the area of the second entity of the SMF is reduced. The FE of the sub Dir. and the entity thereof are created in the SMA-2 area 16.

In such a manner, the SMA-2 area 16 is created. On the outer periphery of the SMA-2 area 16, the SMA-3 area 17 is formed. No process is performed for the SMA-3 area 17. In other words, the SMA-3 area 17 is an unused area. After a format process is performed, data of a file is recorded in the SMA-3 area 17. The RVDS is created skipping the area for the SMA-3 area 17. As was described above, information of the MVDS that has been created is written twice. After the RVDS has been created, the format process of the disc shaped record medium 10 is completed.

Next, a method for adding a sub Dir. after a format process is performed will be described.

Figure 3:
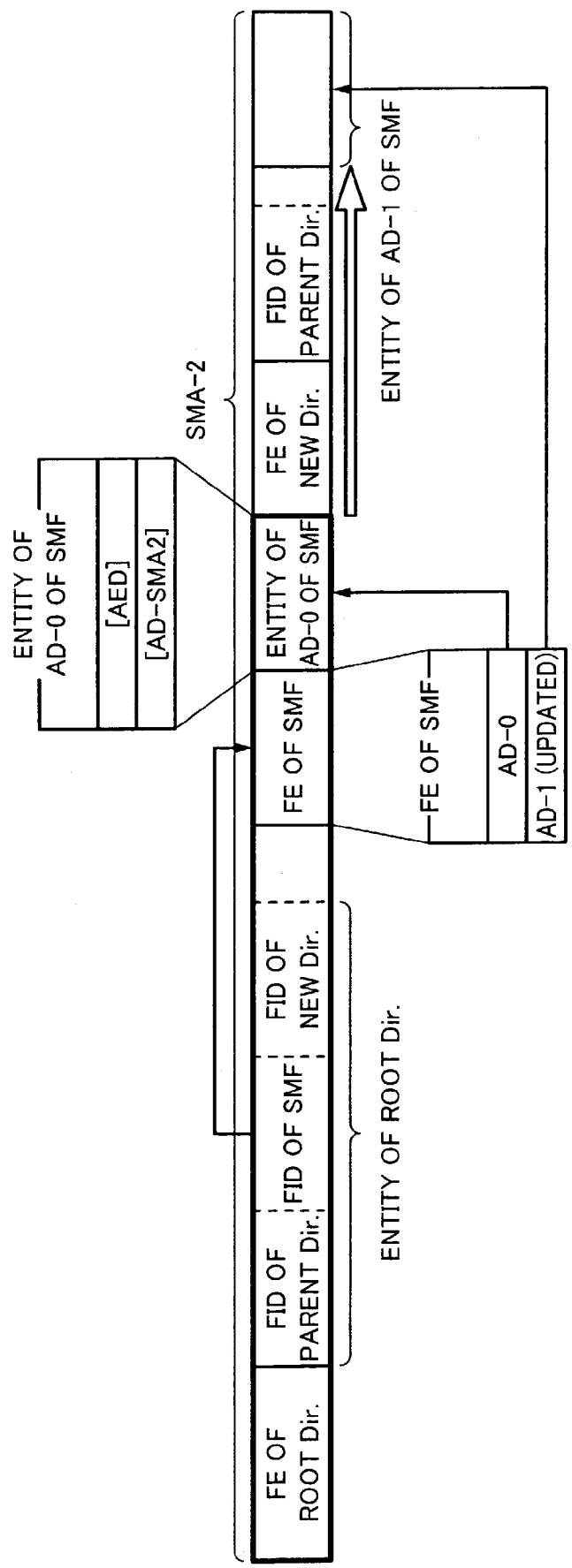
FIG. 3 is a schematic diagram for explaining a method for adding a sub directory after a format process has been performed.

FIG. 3 is a schematic diagram for explaining a method for adding a sub directory after a format process is performed according to the first embodiment.

The case that a sub Dir. (new Dir.) is added in the state shown in FIG. 2 will be described.

First of all, an FID that represents a new Dir. is added to an entity of a root Dir. At that point, when a sector for the entity of the root Dir. has a blank area, as shown in FIG. 3, the FID is added to the sector. In contrast, when the sector does not have a blank space (not shown), after the size of the area of a second entity of an SMF is reduced, the FID of the new Dir. is added to the resultant blank area.

Next, to add an FE of the new Dir., the length of the area of the second entity of the SMF is reduced. The FE of the new Dir. is added to the resultant blank area.

Next, to add an entity of the new Dir. (an FID of a parent Dir. in FIG. 3), the length of the second entity of the SMF is further reduced. The entity of the new Dir. is added to the resultant blank area.

Next, to reflect the change of the length of the second entity of the SMF, information of an AD-1 of the FE of the SMF is updated.

As a result, as shown in FIG. 3, the sub Dir. has been added to the SMA-2 area 16. In addition, information with respect to the added sub Dir. and information with respect to the directory that has been recorded are collectively recorded in the SMA-2 area 16.

Next, a process for adding a file to a root Dir. will be described.

Figure 4:
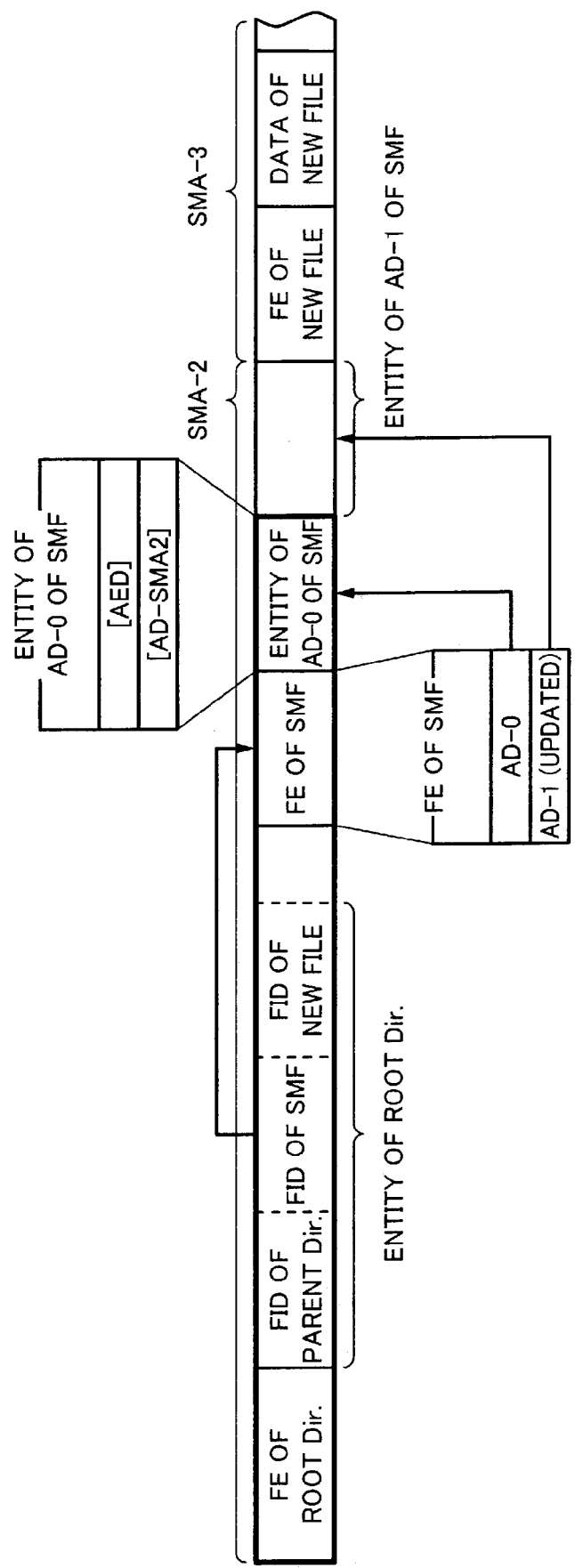
FIG. 4 is a first part of a schematic diagram for explaining a process for adding a file under a root directory after a format process has been performed according to the first embodiment.

FIG. 4 is a first part of a schematic diagram for explaining a process for adding a file under a root directory after a format process has been performed according to the first embodiment of the present invention.

Figure 5:
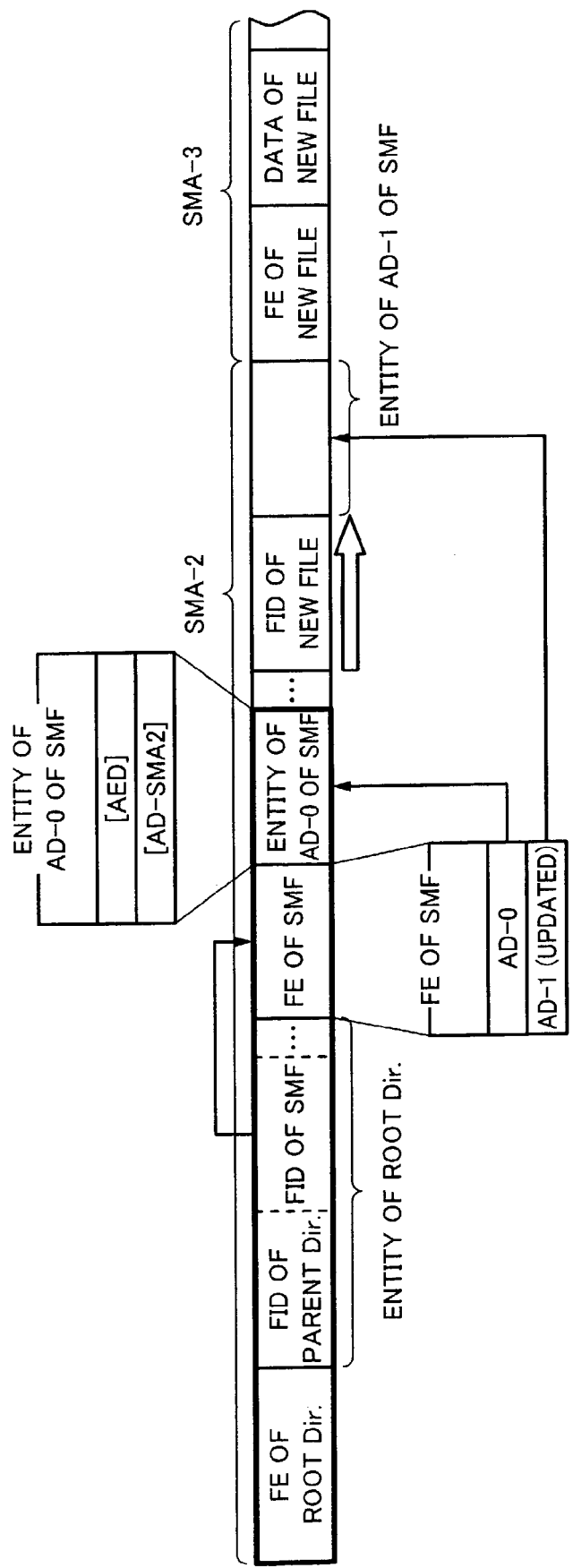
FIG. 5 is a second part of a schematic diagram for explaining a process for adding a file under a root directory after a format process has been performed according to the first embodiment.

FIG. 5 is a second part of a schematic diagram for explaining a process for adding a file under a root directory after a format process has been performed according to the first embodiment of the present invention.

Next, the case that a file (new Dir.) is added to a root Dir. in the state shown in FIG. 2 will be described.

First of all, an FID that represents a new file is added to an entity of a root Dir. At that point, when a sector for the entity of the root Dir. has a blank space, as shown in FIG. 4, the FID is added to the sector.

In contrast, when the sector does not have a blank space, as shown in FIG. 5, the length of an area for a second entity of an SMF is reduced. The FID of the new file is added to the resultant blank area. In this case, since the length of the second entity of the SMF has been changed, information of an AD-1 of the FE of the SMF is updated.

Next, an FE of the new file is added to an SMA-3 area 17. Next, an entity of the new file (data of a parent file in FIGS. 4 and 5) is added to the SMA-3 area 17. In such a manner, the FE of the file and the entity thereof are placed in the SMA-3 area 17.

As a result, as shown in FIG. 4 or 5, the new file is added to the root Dir. In addition, information with respect to the added new file and information with respect to an existing directory that has been recorded are collectively recorded in the SMA-2 area 16.

When a plurality of files are recorded, to allow them to be successively accessed at high speed, it is preferred to successively place an FE of one file, an entity thereof, an FE of another file, an entity thereof, and so forth.

An FE of a file to be added (the file is referred to as file A) is created at an address represented by an FID added to an entity of the root Dir. An entity of the file A is written to an address adjacent to the FE of the address A. When file B, file C, . . . , and so forth are successive written, an entity of the file B is created at an address adjacent to the address of the entity of the file A. An entity of the file B is written at an address adjacent to the address of the FE of the file B. This applies to the file C. In other words, an FE of the file C is written at an address adjacent to the address of the entity of the file B. An entity of the file C is written at an address adjacent to the address of the FE of the file C.

When many sub Dirs. and new files are added to a root Dir. placed in an SMA-2 area 16, an FID of an entity of the root Dir., FEs of sub Dirs., and FIDs of new files of entities of the sub Dirs. are added. As a result, it can be considered that the SMA-2 area 16 becomes full with the added FEs and FIDs. This state is shown in FIG. 6.

Figure 6:
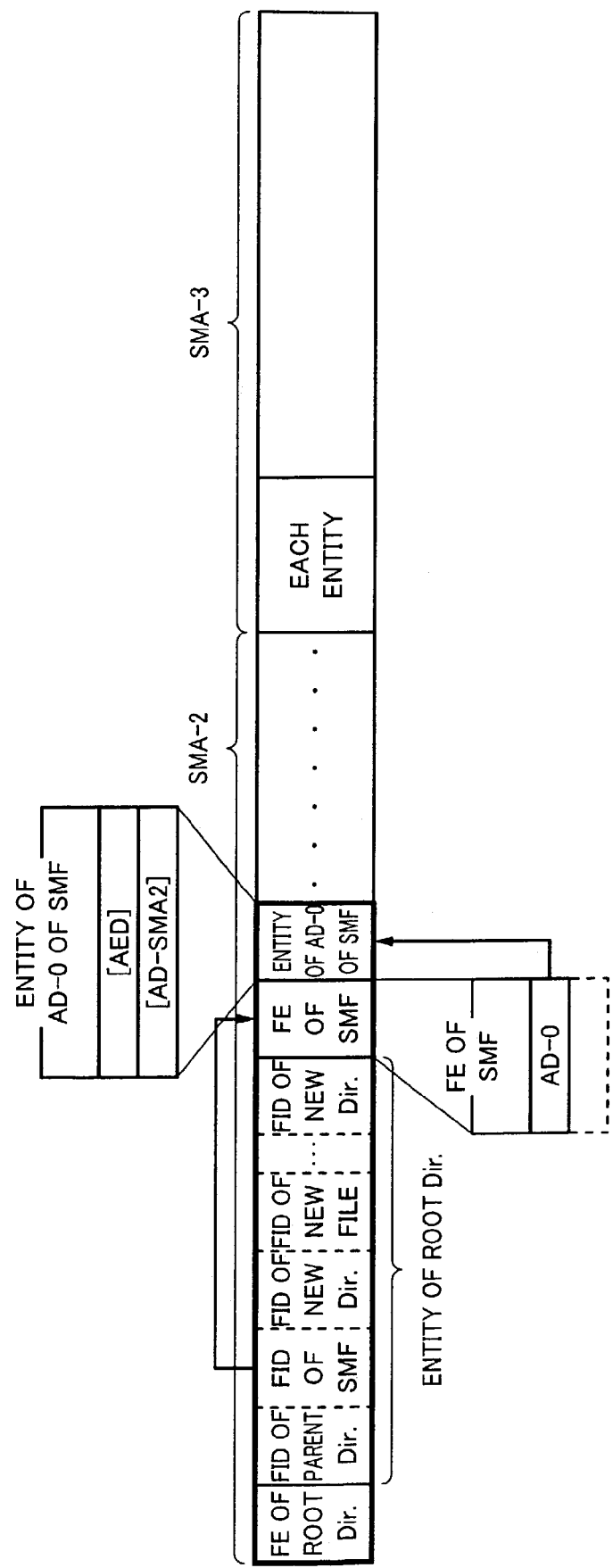
FIG. 6 is a schematic diagram for explaining a state that a second entity of an SMF has run out according to the first embodiment.

FIG. 6 is a schematic diagram for explaining the state that the second entity of the SMF has run out according to the first embodiment.

In FIG. 6, since the second entity of the SMF has run out, an AD-1 that represents the second entity of the SMF has been lost. However, since the first entity of the SMF describes the information with respect to the second entity of the SMF, the drive apparatus can recognize the location and the length of the SMA-2 area 16. As a result, the drive apparatus can recognize the relation between directories and files at high speed.

In this case, when the SMA-3 area 17 has a blank space, the SMA-3 area 17 is divided into a plurality of SMA areas.

As a result, an SMA-4 area that is an extension area of the SMA-2 area 16 and an SMA-5 area equivalent to the SMA-3 area in which data is recorded are newly created outside the location of a file in the SMA-3 area 17. This state is shown in FIG. 7.

Figure 7:
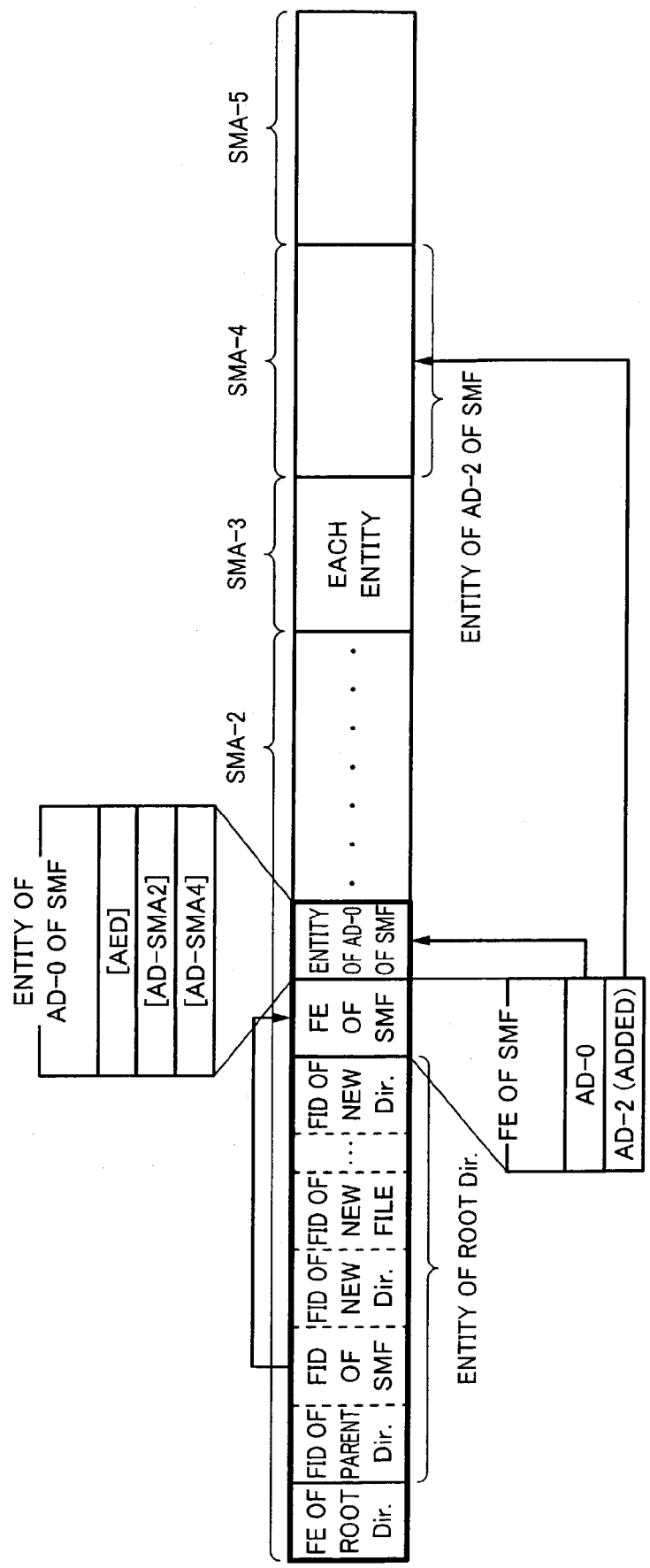
FIG. 7 is a schematic diagram for explaining a process for extending the second entity of the SMF according to the first embodiment.

FIG. 7 is a schematic diagram for explaining a process for extending the second entity of the SMF according to the first embodiment.

In FIG. 7, since the SMA-4 area is allocated, information with respect to the initial location and the length of the SMA-4 area is added in the AD format as [AD-SMA4] to an entity represented by the AD-0 of the SMF. As the table is added, [AED] is updated. A location and a length that represent the newly allocated SMA-4 area are added as an AD-2 to the FE of the SMF.

When a sub Dir. or a file is added to the root Dir., the forgoing operation described with reference to FIGS. 3 to 5 is performed for the second entity of the SMF represented by the AD-2.

Next, the case that a sub Dir. is deleted will be described.

Figure 8:
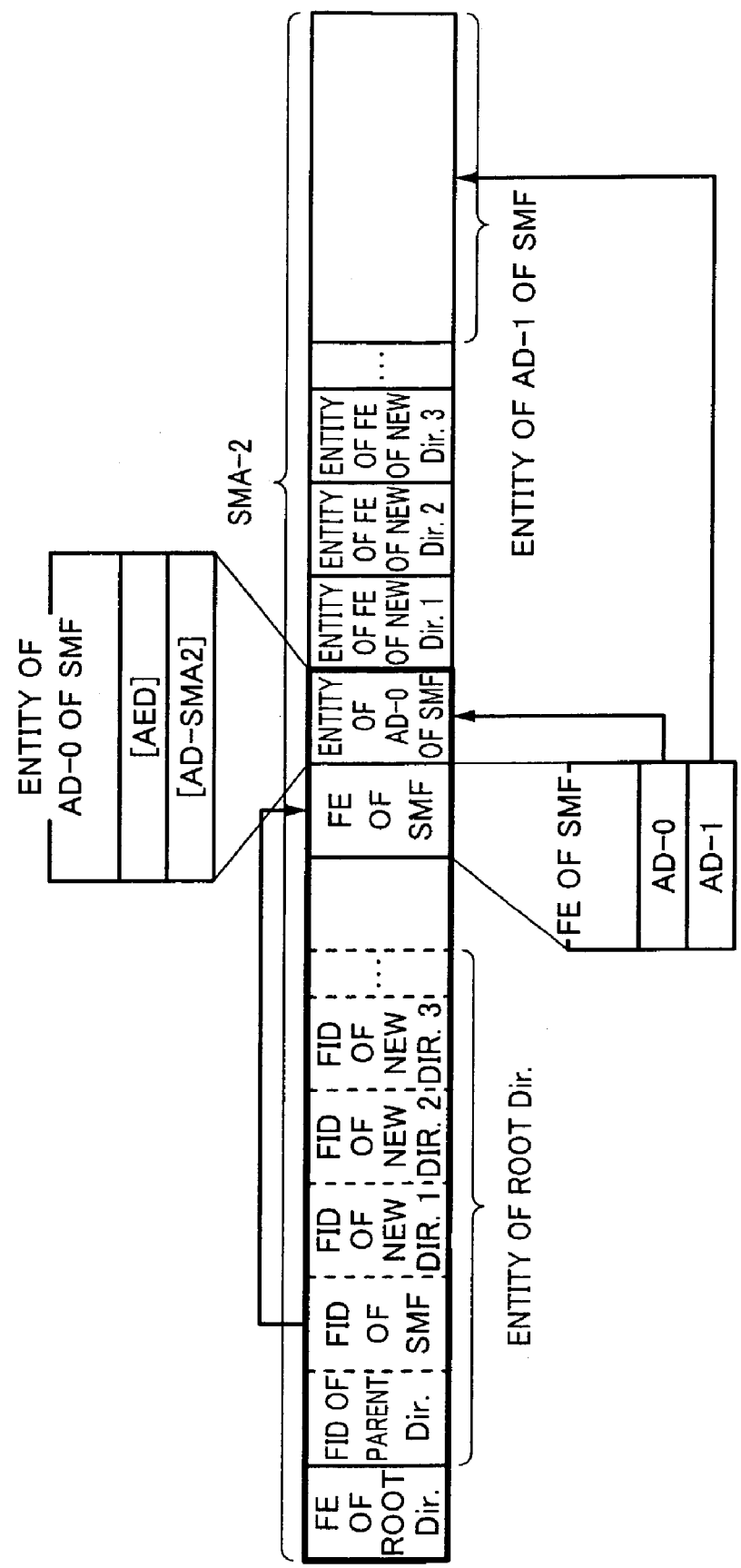
FIG. 8 is a first part of a schematic diagram for explaining a method for deleting a sub directory that has been added after a format process had been performed according to the first embodiment.

FIG. 8 is a first part of a schematic diagram for explaining a method for deleting a sub directory that has been added after a format process had been performed according to the first embodiment.

Figure 9:
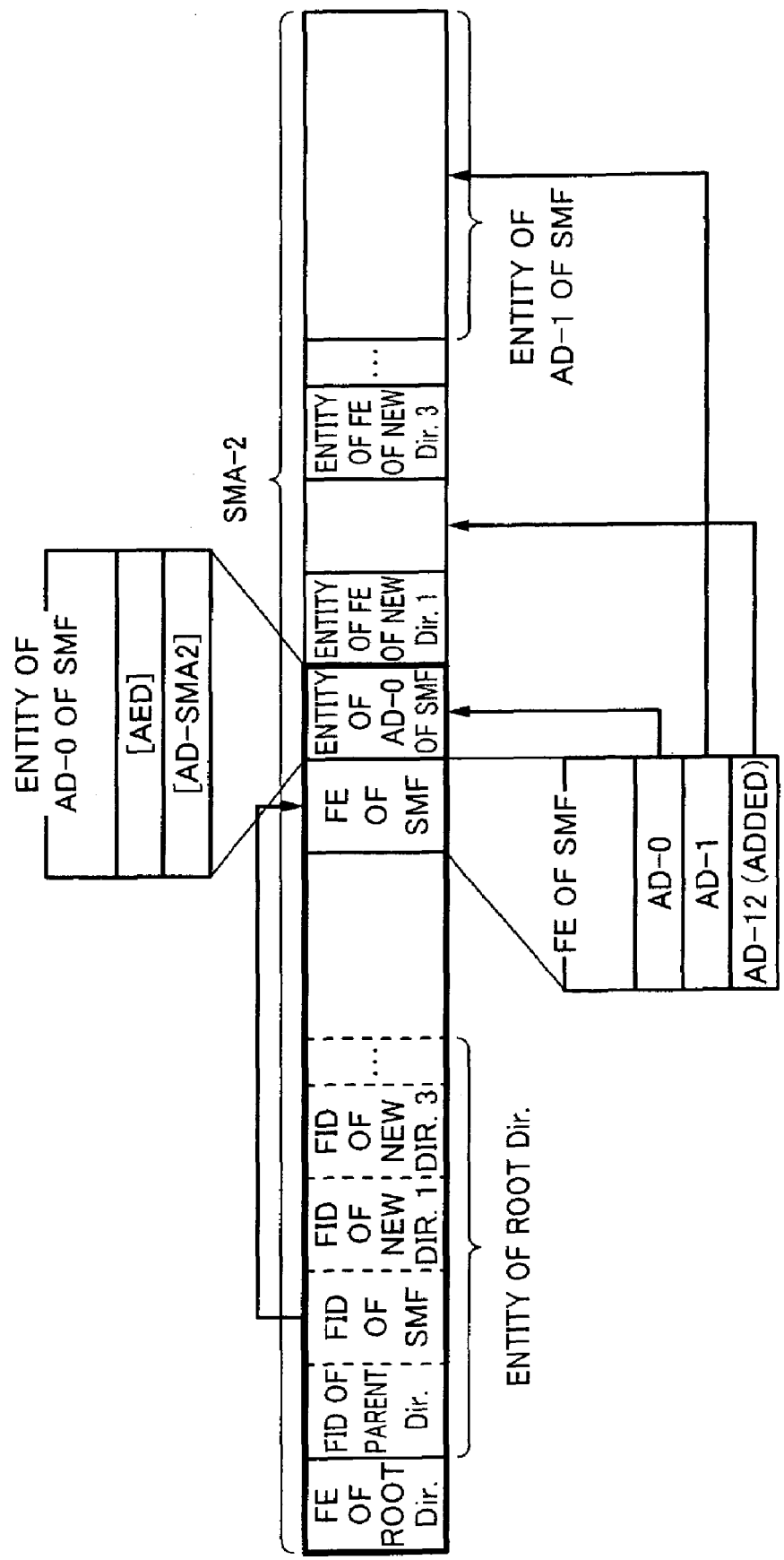
FIG. 9 is a second part of a schematic diagram for explaining a method for deleting a sub directory that has been added after a format process had been performed according to the first embodiment.

FIG. 9 is a second part of a schematic diagram for explaining a method for deleting a sub directory that has been added after a format process had been performed according to the first embodiment.

FIG. 8 shows the state of an SMA-2 area 16 before a sub Dir. is deleted. FIG. 9 shows the state of the SMA-2 area 16 after the sub Dir. has been deleted.

In FIG. 8, as was described with reference to FIG. 3, after a format process had been performed, a plurality of sub Dirs. have been added, FIDs of added sub Dirs. (for example, an FID of new Dir. 1, an FID of new Dir. 2, an FID of new Dir. 3, . . . , and so forth) are added to the entity of the root Dir. Correspondingly, in a blank area of which the second entity of the SMF is reduced, FEs and entities of the added sub Dirs. (for example, an FE and an entity of the new Dir. 1, an FE and an entity of the new Dir. 2, an FE and an entity of the new Dir. 3, and so forth are added).

Next, the case that a sub Dir. is deleted in such a state will be described.

First of all, the drive apparatus references a first entity of an SMF represented by an AD-0 of an FE of the SMF and recognizes an initial range of a second entity with a location and a length represented by [AD].

Next, the drive apparatus deletes an FID, an FE, and an entity of a sub Dir. to be deleted. To reflect their deletion, an entity in which the FID to be deleted is described is updated.

Next, the drive apparatus determines whether or not the FE and the entity of the sub Dir. that has been deleted are in their initial ranges.

When the FE and the entity of the sub Dir. that have been deleted are in their initial ranges, since the areas for the FE and the entity of the sub Dir. that has been deleted becomes unused areas, the drive apparatus adds an AD that represents the unused areas to the FE of the SMF.

For example, in the state shown in FIG. 8, when a sub Dir. to be deleted is the new Dir. 2, as shown in FIG. 9, the FID of the new Dir. 2 is deleted from the entity of the root Dir. An AD that represents sectors for the FE and entity of the new Dir. 2 is added as AD-12 to the FE of the SMF.

Since information with respect to an initial location and a length of a second entity of an SMF is described in a first entity of the SMF, it can be determined whether or not a sub Dir. to be deleted is in the initial range of the second entity of the SMF. When the sub Dir. to be deleted is in the initial range of the second entity of the SMF, by adding the sectors for the FE and the entity of the sub Dir. that has been deleted to the FE of the SMF, the sectors can be treated as the second entity of the SMF. Thus, since the sectors are treated as the SMF, although they are recognized as a part of a file, when a new sub Dir. is added, the sectors can be used. Thus, information with respect to directories can be collected in one area.

In the forgoing example, the case that a sub Dir. is deleted was explained. However, when a file or an FID is deleted, if a blank sector takes place, it is determined whether or not the blank sector is in an initial range of the second entity of the SMF. Corresponding to the determined result, the forgoing process is performed.

Next, a drive apparatus according to the present invention will be described.

Figure 10:
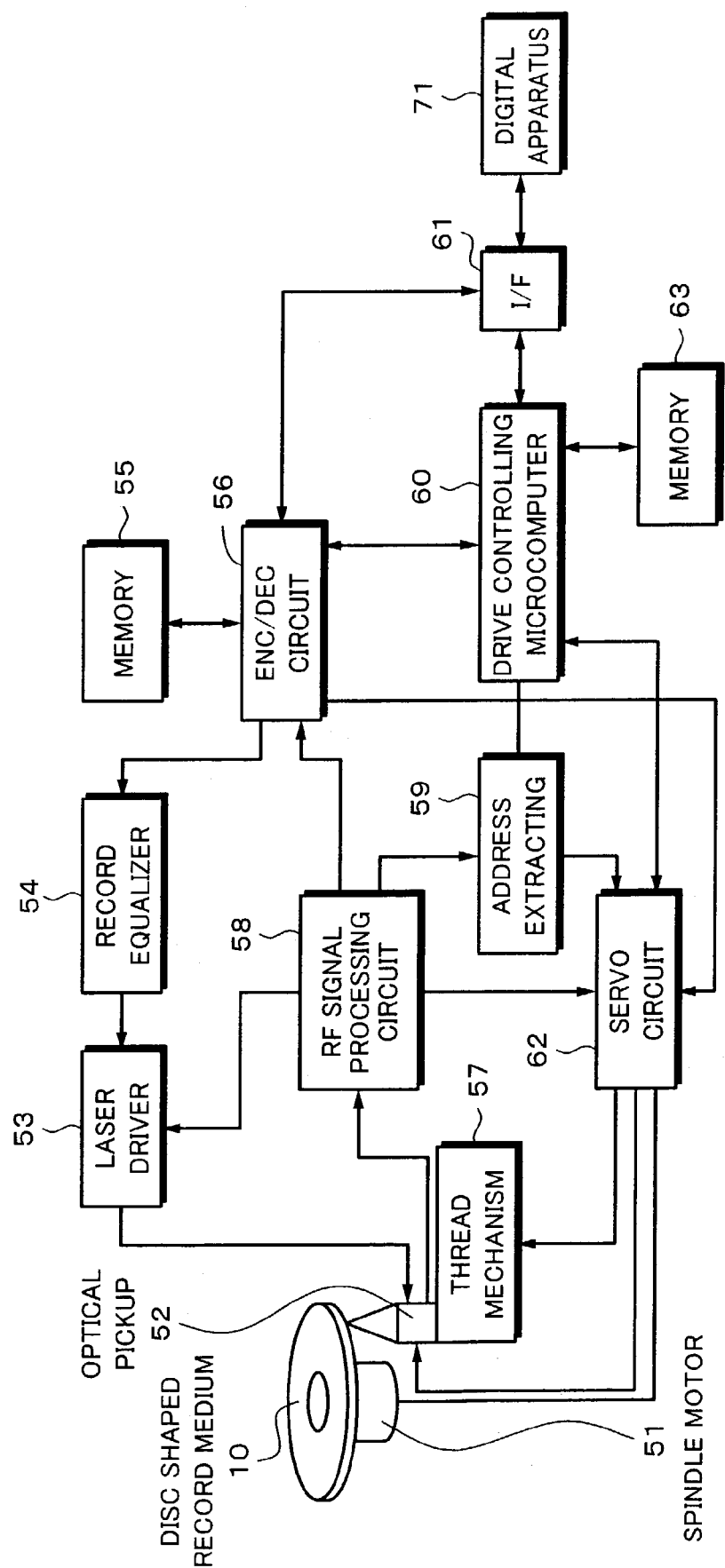
FIG. 10 is a block diagram showing the structure of an example of a drive apparatus.

FIG. 10 is a schematic diagram showing the structure of an example of the drive apparatus.

In this example, the foregoing disc shaped record medium 10 is a record medium whose record layer is made of a phase change metal material. Using a phase change technology of which the temperature applied to the record layer is controlled with the laser output that is adjusted and thereby the crystal/non-crystal states of the record layer are changed, the drive apparatus 50 records data to the disc shaped record medium 10.

In FIG. 10, the drive apparatus 50 comprises a spindle motor 51, an optical pickup 52, a laser driver 53, a record equalizer 54, a buffer memory 55, an encoder/decoder circuit (hereinafter abbreviated as "ENC/DC circuit") 56, a thread mechanism 57, an RF signal processing circuit 58, an address extraction 59, a drive controlling microcomputer 60, an interface (hereinafter abbreviated as "I/F") 61, a servo circuit 62, and a memory 63.

The spindle motor 51 rotates and drives the disc shaped record medium 10 that has been chucked. The rotation speed of the spindle motor 51 is servo-controlled by the servo circuit 62.

Data is recorded or reproduced to/from the disc shaped record medium 10 through the optical pickup 52. The optical pickup 52 is thread-traveled in the radius direction of the disc shaped record medium 10 by the thread mechanism 57.

Data that is input from an external digital apparatus 71 is supplied to the drive apparatus 50 through the I/F 61, for example, SCSI (Small Computer System Interface). The digital apparatus 71 inputs and outputs a digital signal. As long as the digital apparatus 71 inputs and outputs a digital signal and complies with the interface, any digital apparatus 71 can be used. The digital apparatus 71 is for example a personal computer, a camera integrated portable digital video camcorder, a digital still camera, or a cellular phone. The digital apparatus 71 may be built in one of those apparatuses.

The ENC/DEC circuit 56 and the drive controlling microcomputer are connected to the I/F 61. The buffer memory 55, the record equalizer 54, the RF signal processing circuit 58, the servo circuit 62, and the drive controlling microcomputer 60 are connected to the ENC/DEC circuit 56.

The memory 55 is a buffer memory that stores write data or read data. Write data is supplied from the digital apparatus 71 to the ENC/DEC circuit 56 through the I/F 61. In the recording mode, the ENC/DEC circuit 56 generates data in the forgoing format and encodes data corresponding to the format. In the reproducing mode, the ENC/DEC circuit 56 performs a decoding process and outputs the decoded data to the digital apparatus 71 through the I/F 61.

An address is added as a sub code by the ENC/DEC circuit 56. In addition, an address is added to a header of data.

Data that is output from the ENC/DEC circuit 56 is supplied to the laser driver 53 through the record equalizer 54. The laser driver 53 generates a drive waveform having a predetermined level necessary for recording data to the disc shaped record medium 10. An output signal of the laser driver 53 is supplied to a laser device of the optical pickup 52. The laser device radiates laser light having an intensity corresponding to the output signal to the disc shaped record medium 10. As a result, the data is recorded on the disc shaped record medium 10. The laser driver 53 properly controls the intensity of the laser light under the control of an APC (Automatic Power Control) of the RF signal processing circuit 58.

In contrast, a signal generated by the optical pickup 52 corresponding to light reflected from the disc shaped record medium 10 is supplied to the RF signal processing circuit 58. The address extracting circuit 59 extracts address information corresponding to the signal supplied from the RF signal processing circuit 58. The extracted address information is supplied to the drive controlling microcomputer 60.

A matrix amplifier of the RF signal processing circuit 58 calculates a detection signal of a photo detector of the optical pickup 52. As a result, the RF signal processing circuit 58 generates a tracking error signal TE and a focus error signal FE. The tracking error signal TE and the focus error signal FE are supplied to the servo circuit 62.

The drive controlling microcomputer 60 controls a seek operation with an address and controls a laser power with a control signal. The drive controlling microcomputer 60 comprises a CPU (Central Processing Unit), a RAM (Random Access Memory), and a ROM (Read Only Memory). The drive controlling microcomputer 60 controls the entire drive apparatus such as the I/F 61, the ENC/DEC circuit 56, the RF signal processing circuit 58, and the servo circuit 62. Thus, the drive controlling microcomputer 60 performs the forgoing various processes when a sub Dir. is added or deleted and a file is added or deleted. The memory 63 may be connected to the drive controlling microcomputer 60.

In addition, an RF signal that is reproduced from the disc shaped record medium 10 is supplied to the ENC/DEC circuit 56. The ENC/DEC circuit 56 performs a decoding process corresponding to a predetermined format. In other words, the ENC/DEC circuit 56 demodulates data that has been modulated in the recording mode and decodes an error correction code (namely, corrects an error). The ENC/DEC circuit 56 stores the reproduced data to the buffer memory 55. When the buffer memory 55 receives a read command from the digital apparatus 71, the read data is transferred to the digital apparatus through the I/F 61.

The frame synchronous signal, the tracking error signal TE, and the focus error signal FE that are output from the RF signal processing circuit 58, and the address information that is output from the address extracting circuit 59 are supplied to the servo circuit 62. The servo circuit 62 performs a tracking servo and a focus servo for the optical pickup 52, a spindle servo for the spindle motor 51, and a thread servo for the thread mechanism 57.

Second Embodiment

According to a second embodiment of the present invention, even if a defect takes place in management information for managing the hierarchical structure of a file system, the management information can be recovered and read at high speed.

FIG. 11 is a schematic diagram for explaining the structure of an SMA-2 after a format process has been performed according to the second embodiment. FIG. 2A shows an SMA-2 area, whereas FIG. 2B shows an SMA-3 area, in particular, an entity of an BOS.

In FIGS. 1 and 11, a logical format of a disc shaped record medium according to the second embodiment is the same as the logical format according to the first embodiment except that an SMA-2 area 16 has an FE of a BOS (Back-up Of Space management file) and an SMA-3 area 17 has an entity of the BOS. Next, only the difference between the logical format of the second embodiment and the logical format of the first embodiment will be described.

Figures 11A, 11B:
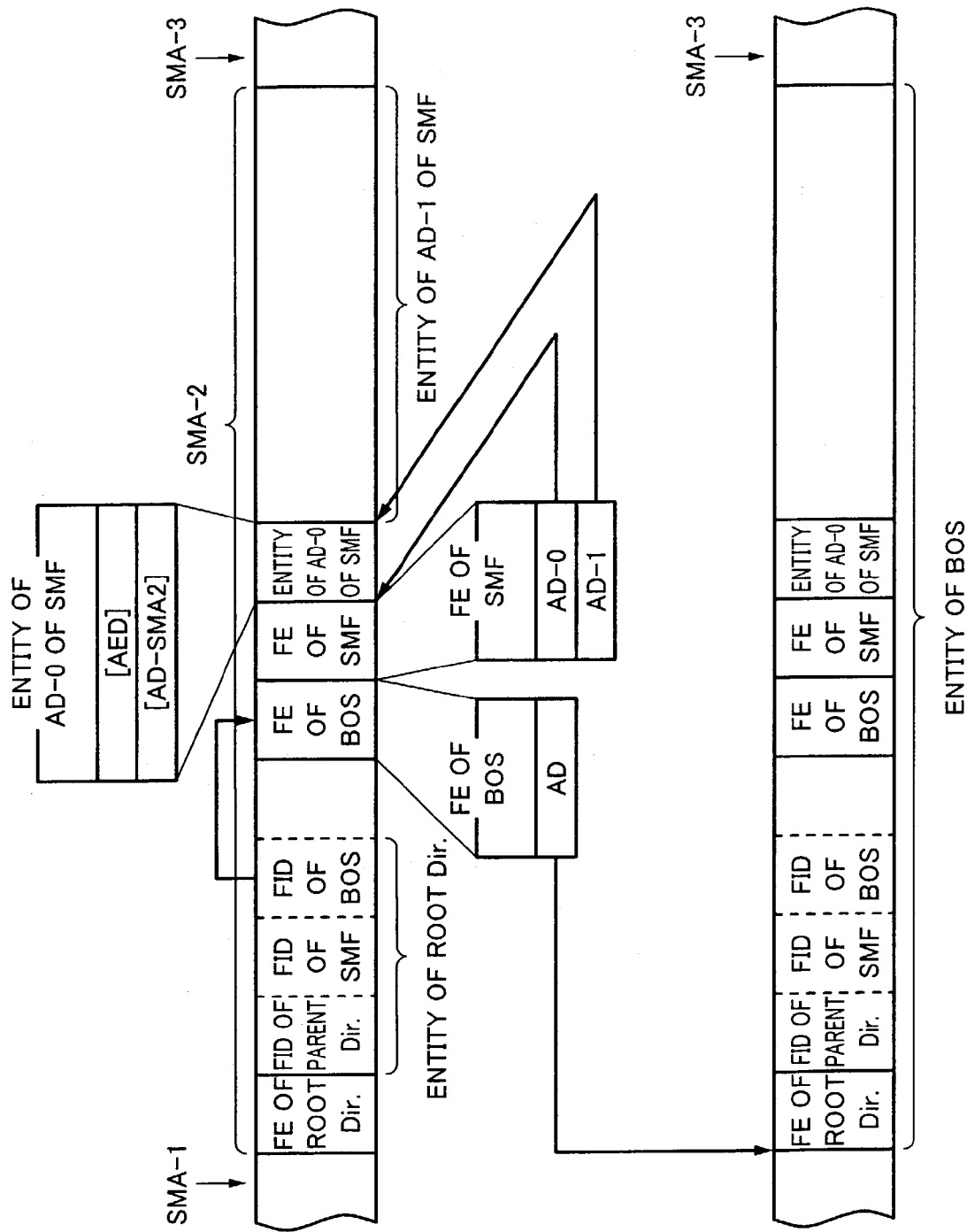
FIG. 11 is a schematic diagram for explaining the structure of an SMA-2 after a format process has been performed according to a second embodiment.

The SMA-3 area 17 is an area that contains an FE of a file and data thereof. The SMA-3 area 17 also contains an entity of the BOS (data of the BOS). The entity of the BOS is a file that backs up management information that is collectively recorded in the SMA-2 area 16. As shown in FIG. 11B, the entity of the BOS is a complete copy of the SMA-2 area that is obtained by referencing an entity of an AD-0 of an SMF. The FE of the BOS represents a location and a length of the entity of the BOS. As shown in FIG. 11A, the FE of the BOS is recorded in the SMA-2 area 16. As shown in FIG. 11B, the FE of the BOS is backed up in the entity of the BOS.

Next, an example of a method for formatting the disc shaped record medium 10 according to the second embodiment will be described.

When a format process is started, an AVDP is written to a plurality of addresses. The forgoing VRS, MVDS, and LVIS are written from the outer periphery of a lead-in area 11.

Next, a partition is created. In the partition, an SMA-1 area 15 is created. An FSD is written. The location of a root Dir. is decided. Next, an SBD is created. At that point, an area for an SMF is treated as a used area with the SBD. As a result, the area for the SMF is allocated.

After the SBD is created and then the SMA-1 area 15 is created, an SMA-2 area 16 is created from the outer periphery of the SMA-1 area 15.

When the SMA-2 area 16 is created, corresponding to the FSD written to the SMA-1 area 15, a sector for an FE of a root Dir. and a sector for an entity of the root Dir. are successively allocated at predetermined addresses. The FE and the entity of the root Dir. are written to these sectors.

In the format process, the entity of the root Dir. is composed of an FID of a parent Dir., an FID of an SFM, and an FID of a BOS. The FID of the BOS designates the location of an FE of the BOS.

At that point, attributes of the SMF and BOS are designated in the FIDs thereof. The designated attributes of the SMF and BOS prevent another apparatus and the OS (Operating System) from deleting, rewriting, and moving the SMF and the BOS. For example, "hidden file attribute" is designated as an attribute of each of the SMF and BOS.

Next, the FE of the BOS is created. An AD that designates a location and a length of an entity of the BOS are placed in the FE of the BOS. The length of the entity of the BOS is a length for which information of the SMA-2 area 16 can be completely copied. Next, an FE of the SMF is created.

By designating the FE, the file is created. Thus, by creating the FE of the BOS and the FE of the SMF, the area for the entity of the SMF and the area for the entity of the BOS can be allocated.

In addition, both "read only file attribute" and "system file attribute" are designated to the FE of the BOS and the FE of the SMF. When these three attributes are designated to the BOS and the SMF, unless an intentional operation is performed, the BOS and the SMF can be prevented from being deleted, rewritten, and moved.

Next, a first entity of the SMF is created in a sector adjacent to the sector for the entity of the root Dir. An initial location and an initial length of a second entity of the SMF are described in the first entity of the SMF.

In such a manner, when the SMF is placed in the SMA-2 area 16, a blank area of the SMA-2 area 16 can be allocated by the SMF. After the format process is performed, when an FE of a sub Dir. and an entity thereof are written, the area for the second entity of the SMF is reduced. As a result, the FE of the sub Dir. and the entity thereof are created in the SMA-2 area 16.

In such a manner, the SMA-2 area 16 is created. On the outer periphery of the SMA-2 area 16, an SMA-3 area 17 is placed. In a part of the SMA-3 area 17, the entity of the BOS is created. The entity of the BOS is a file of management information for managing the hierarchical structure of the file system. The file is recorded in the SMA-2 area 16. When the format process is performed, the entity of the BOS is composed of the FE of the root Dir., the entity of the root Dir., the FE of the BOS, the FE of the SMF, and the entity of the SMF. The entity of the root Dir. is composed of the FID of the parent Dir., the FID of the SMF, and the FID of the BOS.

The SMA-3 area 17 excluding the entity of the BOS is an unused area. After the format process is performed, data of a file and so forth are recorded in the unused area. By skipping the area designated as the SMA-3 area 17, the RVDS is created. As a result, the format process for the disc shaped record medium 10 is completed.

Next, a method for adding a sub Dir. and a file after a format process has been performed will be described.

Figure 12A:
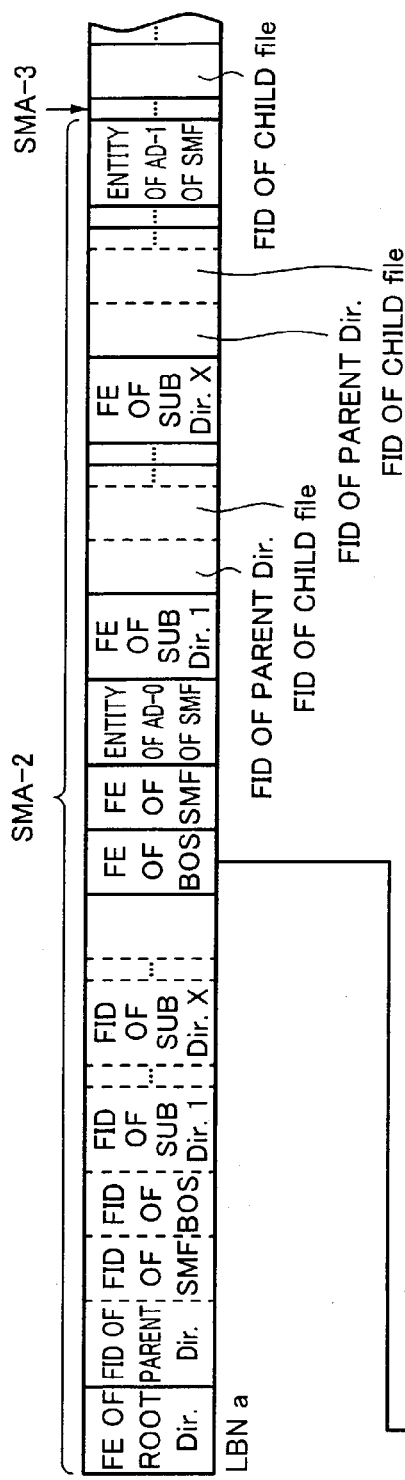
FIG. 12 is a schematic diagram for explaining a method for adding a sub directory and a file after a format process has been performed according to the second embodiment.
Figure 12B:
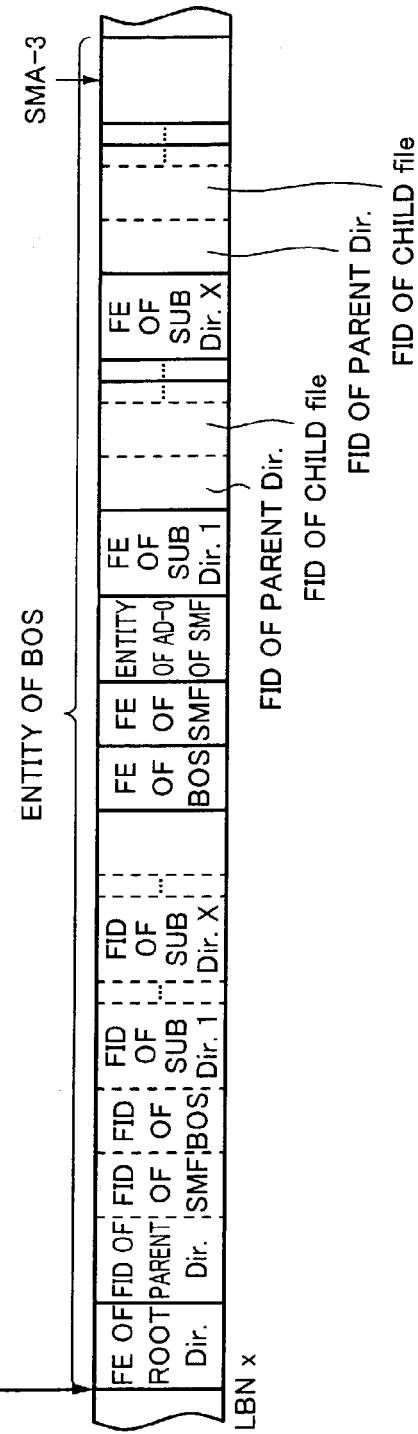

FIG. 12 is a schematic diagram for explaining a method for adding a sub directory and a file after a format process has been performed according to the second embodiment. FIG. 12A shows an SMA-2 area, whereas FIG. 12B shows an SMA-3 area, in particular, an entity of a BOS.

In the state shown in FIG. 11, the case that sub Dir. 1, sub Dir. X, and so forth are added will be described.

First of all, an FID representing the sub Dir. 1 is added to an entity of a root Dir. At that point, when a sector for the entity of the root Dir. has a blank space, as shown in FIG. 12A, the FID is added to the sector. In contrast, when the sector does not have a blank space (not shown), after a length (size) of an area for a second entity of an SMF is reduced, the FID of the sub Dir. 1 is added to the resultant blank area.

Next, to add an FE of the sub Dir. 1, the length of the second entity of the SMF is reduced.

Next, to add an entity of the sub Dir. 1 (an FID of a parent Dir. and an FID of a child file in FIG. 12), the length of the second entity of the SMF is further reduced.

Next, to reflect the change of the length of the second entity of the SMF, the information of the AD-1 of the FE of the SMF is updated.

Next, to reflect the change of the SMA-2 area 16, an entity of a BOS is rewritten. In other words, the content of the SMA-2 area 16 is read and written to the area for the entity of the BOS. The entity of the BOS is composed of an FE of the root Dir., an entity of the root Dir., an FE of the BOS, an FE of the SMF, an entity designated by an AD-0 of the SMF, an FE of the sub Dir. 1, and an entity of the sub Dir. 1. The entity of the root Dir. is composed of an FID of the parent Dir., an FID of the SMF, an FID of the BOS, and an FID of the sub Dir. 1. The entity of the sub Dir. 1 is composed of the FID of the parent Dir. and the FID of the child file.

After such an operation is performed for each of the sub Dir. 2, sub Dir. 3, and so forth, the content of the SMA-2 area 16 becomes as shown in FIG. 12A.

In the forgoing process, whenever the content of the SMA-2 area is changed, the content of the entity of the BOS that backs up the content of the SMA-2 area is changed. However, the present invention is not limited to such an example. Instead, the content of the entity of the BOS may be changed when the disc shaped record medium 10 is inserted or removed into/from the drive apparatus, whenever a predetermined time period elapses, whenever the number of FIDs added to the entity of the root Dir. exceeds a predetermined value (for example, 3), or when a predetermined command is input by the user.

In the forgoing example, the case that a directory is added was described. Next, the case that a file is added will be described.

First of all, an FID that represents a new file is added to an entity of a root Dir. At that point, when a sector for the entity of the root Dir. has a black space, the FID is added to the sector. In contrast, when the sector does not have a blank space, a length of an area for a second entity of an SMF is reduced. The FID of the new file is added to the resultant blank area. In this case, since the length of the second entity of the SMF has been changed, information of an AD-1 of an FE of the SMF is updated. Next, an FE of the new file is added to an area for an SMA-3 area 17. Next, an entity of the new file is added to the area for the SMA-3 area 17. In such a manner, the FE and the entity of the file are placed in the SMA-3 area 17.

As a result of such an operation, the new file is added to the root Dir. In addition, information with respect to the added new file and information with respect to a directory that has been recorded are collectively recorded in the SMA-2 area 16.

When many sub Dirs. and many new files are added to the root Dir. placed in the SMA-2 area 16, an FID of an entity of the root Dir., FEs of sub Dirs., and FIDs of new files in the entities of the sub Dirs. are added. As a result, it can be considered that the added FEs and FIDs cause the SMA-2 area 16 to become full.

In such a case, when the SMA-3 area 17 has a blank space, it is divided into a plurality of SMA areas that are an SMA-4 area as an extension area of the SMA-2 area 16 and an SMA-5 area equivalent to the SMA-3 area in which data is recorded. As a result, the SMA-4 area and the SMA-5 area are newly created on the outer periphery of the location of a file of the SMA-3 area 17.

Figure 13A:
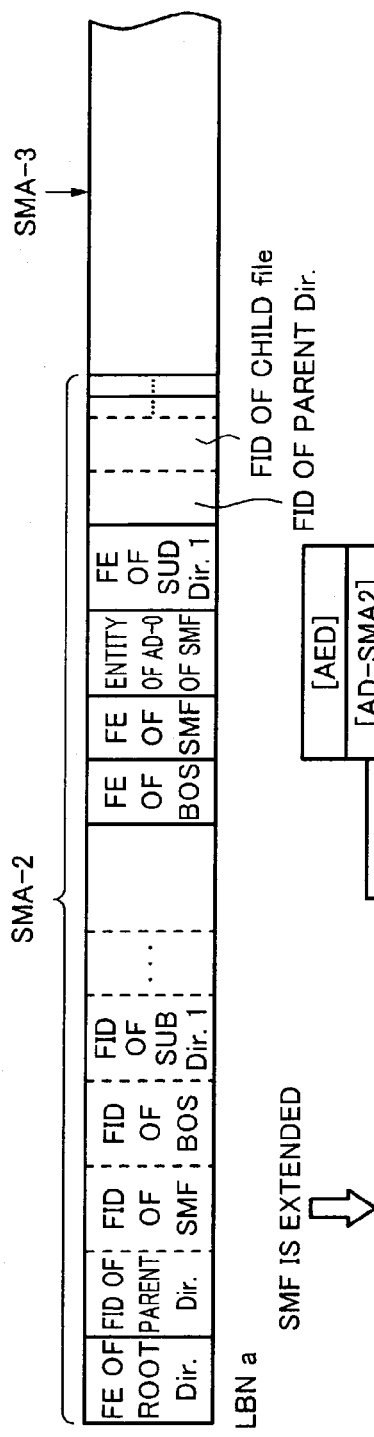
FIG. 13 is a schematic diagram showing states of an SMA-2 area, an SMA-4 area, and a backup file in the case that a second entity of an SMF has been extended according to the second embodiment.
Figure 13B:
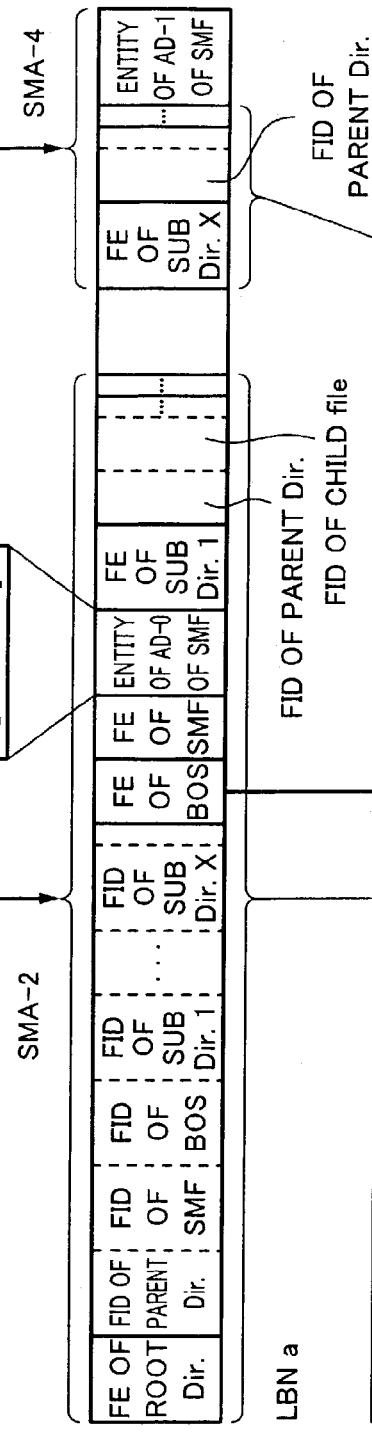
Figure 13C:
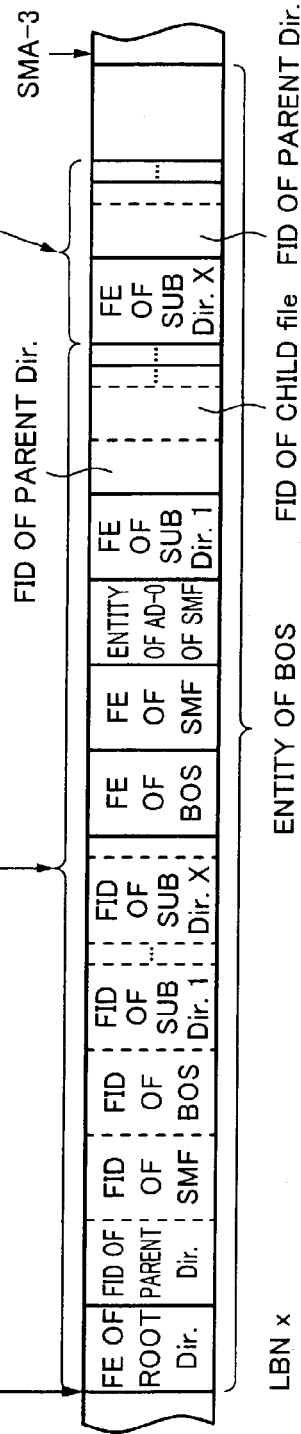

FIG. 13 is a schematic diagram showing states of an SMA-2 area and an SMA-4 area and a state of a backup file in the case that a second entity of an SMF is extended according to the second embodiment. FIG. 13A shows the state of the SMA-2 area in the case that the second entity of the SMF has run out. FIG. 13B shows the states of the SMA-2 area and the SMA-4 area in the case that the second entity of the SMF has been extended. FIG. 13C shows the state of the backup file.

In FIG. 13B, since the SMA-4 area is allocated, information with respect to an initial location and an initial length of the SMA-4 area is added as [AD-SMA4] in AD format to an entity designated by an AD-0 of an SMF. As the table is added, [AED] is updated. A location and a length that represent the newly allocated SMA-4 area are added as AD-2 to an FE of the SMF.

When an area for an backup of the content of the SMA-4 area has not been allocated in the SMA-3 area, an entity of a BOS is extended to an SMA-5 area (not shown). An AD that describes a location and a length that represent the extended entity of the BOS is added to an FE of the BOS of the SMA-2 area 16.

When a sub Dir. and a file are added to the root Dir., an operation similar to that described with reference to FIGS. 11 and 12 is performed for the second entity of the SMF designated by the AD-2.

When a backup file is created, as shown in FIGS. 13B and 13C, only management information placed in the SMA-2 area and the SMA-4 area is baked up. In other words, the entity of the BOS is created by referencing [AD-SMA2] of the entity of the AD-0 of the SMF, directly copying the SMA-2 area, referencing [AD-SMA4], and directly copying the SMA-4 area.

Next, a method for recovering an FE of a sub Dir. in management information placed in the SMA-2 area in the case that the FE of the sub Dir. cannot be read will be described.

FIG. 14 is a schematic diagram for explaining a process for recovering an FE of a sub Dir. in the case the a defect has taken place in the FE of the sub Dir. according to the second embodiment.

Figure 14A:
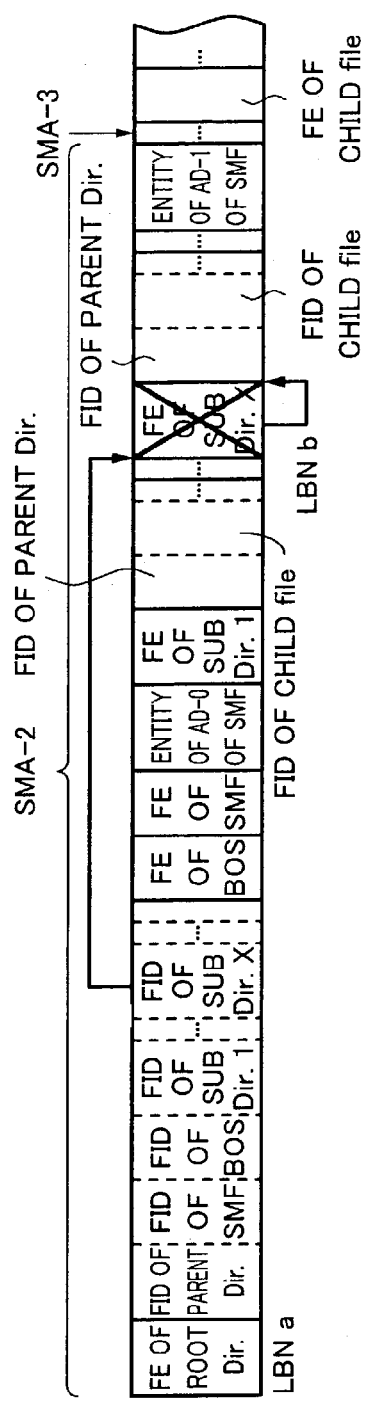
FIG. 14 is a schematic diagram for explaining a process for recovering an FE of a sub Dir. in that case that a defect has taken place in the FE of the sub Dir. according to the second embodiment.
Figure 14B:
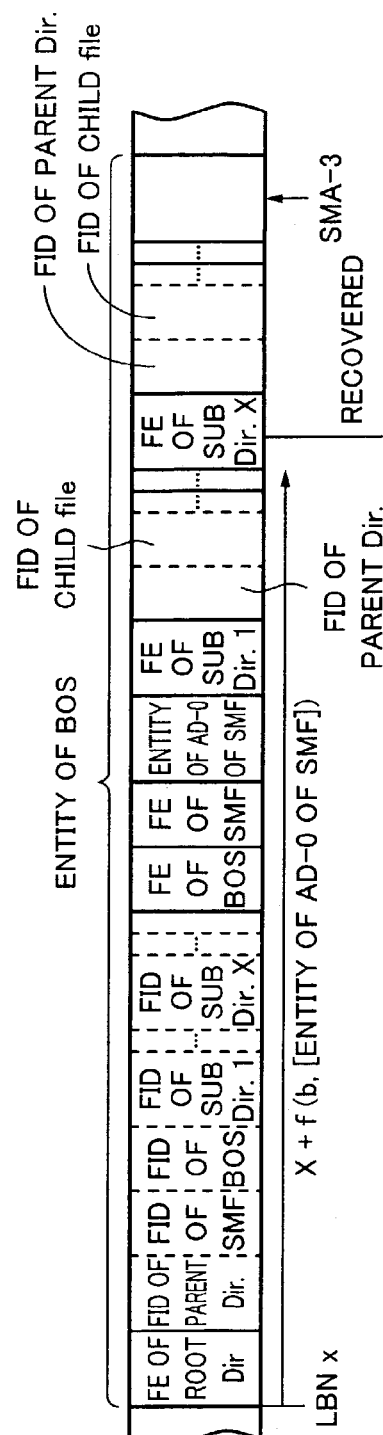
Figure 14C:
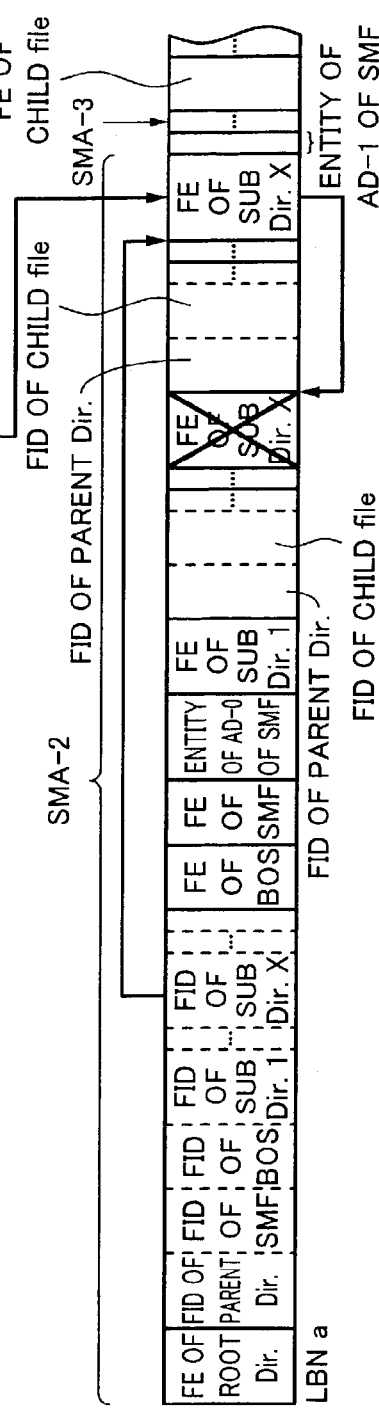

FIG. 14A shows a state that a defect has taken place in sub Dir. X. FIGS. 14B and 14C show a state that an FE of the sub Dir. X has been recovered in an SMA-2 area 16 using the FE of the sub Dir. X placed in an entity of a BOS.

In FIG. 14A, an FID of the sub Dir. X under a root Dir. is placed in an entity of the root Dir. The FID of the sub Dir. X designates the FE of the sub Dir. X placed in LBNb. The FE of the sub Dir. X designates an entity of the sub Dir. X. The entity of the sub Dir. X is composed of an FID of a parent Dir., an FID of a child file, and so forth.

When the FE of the sub Dir. X cannot be read due to a defect in such a case, an implementation recovers management information using the entity of the BOS.

First of all, the implementation checks the LBNb that represents the FE of the sub Dir. X, LBNx that represents the entity of the BOS, and an entity of an AD-0 of an SMF. The implementation recognizes LBNa that represents the start location of the SMA-2 area 16 by referencing the entity of the AD-0 of the SMF.

Next, using the recognized result, the implementation checks a location of the FE of the sub Dir. X placed in the entity of the BOS.

The implementation checks the entity of the AD-0 of the SMF because there is a possibility of which while the disc shaped record medium is being used, an FE of a sub Dir., an entity thereof, and an FID of a file cause the SMA-2 area 16 to be extended.

Thus, in the case shown in FIG. 13C, when the implementation checks the location of the FE of the sub Dir. X placed in the entity of the BOS, assuming that LBN of the FE of the sub Dir. X represented by the FID is LBNb, the implementation determines an initial location of the LBNb in the second entity of the SMF. In other words, the implementation determines whether the LBNb is in the SMA-2 area with [AD-SMA2] or in the SMA-4 area with [AD-SMA4]. As a result, the implementation obtains an offset value from the LBN a. In other words, when the LBNb is in the SMA-2 area, the offset value is (LBNb−LBNa). When the LBNb is in the SMA-4 area, the offset value is (length of SMA-2 area)+(LBNb−(start LBN of SAM-4 area)). The offset value is denoted by f (LBNb, [entity of AD-0 of SMF]). In is case, y=f (x) represents that y is a function of x.

When the SMF is not extended, the location of the FE of the sub Dir. X is LBNx+(LBNb−LBNa). When offset value=f (LBNb, [entity of AD-0 of SMF]) is calculated with the LBNX, the implementation can recognize the FE of the sub Dir. X placed in the entity of the BOS.

Next, the implementation reads the FE of the sub Dir. X from the entity of the BOS.

Next, to add the FE of the sub Dir. X that has been read, the implementation reduces the length of the area for the second entity of the SMF, changes the descriptor tag in a predetermined manner, and adds the FE of the sub Dir. X to the resultant blank area.

Next, to reflect the change of a length of the second entity of the SMF, the implementation updates the information of an AD-1 of an FE of the SMF.

Next, to reflect the change of a location of the FE of the sub Dir. X, the implementation rewrites an FID of the sub Dir. X.

Next, to prohibit a defective sector from being accessed, the implementation causes the defective sector to be excluded from the SMF that is managed. In other words, the implementation excludes the defective sector from an entity of an AD-0 of the SMF, the entity defining the initial area of the SMF.

Next, to reflect the change of an SMA-2 area 16, the implementation rewrites the entity of the BOS.

In such a manner, when the entity of the BOD as a backup of the FE of the sub Dir. X is referenced and the length of the area for the second entity of the SMF is reduced, the defective FE of the sub Dir. X can be recovered in the management information placed in the SMA-2 area 16. Thus, even if the defective FE of the sub Dir. X is recovered, the management information can be collectively placed in the SMA-2 area 16.

Next, a method for recovering an entity of a sub Dir. in management information placed in an SMA-2 area 16 in the case that the entity of the sub Dir. 1 cannot be read will be described.

FIG. 15 is a schematic diagram for explaining a process for recovering an entity of a sub Dir. in the case that a defect has taken place in the entity of the sub Dir. according to the second embodiment.

FIG. 15A shows a state that a defect has taken place in an entity of sub Dir. X. FIGS. 15B and 15C shows a state that the entity of the sub Dir. X is recovered to an SMA-2 area 16 using the entity of the sub Dir. X placed in an entity of a BOS.

In FIG. 15A, an FID of the sub Dir. X under a root Dir. is placed in an entity of the root Dir. The FID of the sub Dir. X designates an FE of the sub Dir. X. The FE of the sub Dir. X designates the entity of the sub Dir. X placed in LBNC. The entity of the sub Dir. X is composed of an FID of a parent Dir., an FID of a child file, and so forth. The FID of the parent Dir. designates an FE of sub Dir. 1. The FID of the child file designates an FE of a child file placed in an SMA-3 area 17. The FE of the child file designates entity data o the child file.

In such a case, if the entity of the sub Dir. X cannot be read due to a defect, the drive apparatus recovers management information using an entity of a BOS.

First of all, the implementation checks LBNC that designates the entity of the sub Dir. X, LBNx that designates the entity of the BOS, and an entity of an AD-0 of an SMF.

Next, with the checked result, the implementation calculates an offset from the LBNx and obtains a location of the entity of the sub Dir. X placed in the entity of the BOS.

Next, the implementation reads the entity of the sub Dir. X from the entity of the BOS.

Next, to add the entity of the sub Dir. X that has been read, the implementation reduces a length of an area for a second entity of an SMF and adds the entity of the sub Dir. X to the resultant blank area.

Next, to reflect the change of the length of the second entity of the SMF, the implementation updates information of an AD-1 of an FE of an SMF.

Next, to reflect the change of a location of the entity of the sub Dir. X, the implementation rewrites an FE of the sub Dir. X.

Next, to prohibit the defective sector from being accessed, the implementation causes the defective sector to be excluded from the SMF that is managed. As a result, the defective sector is not accessed. Thus, the backup can be securely performed.

Next, to reflect the change of an SMA-2 area 16, the implement rewrites the entity of the BOS.

When the entity of the BOD is referenced and the length of the second entity of the SMF is reduced, the defective entity of the Dir. X can be recovered to the management information placed in the SMA-2 area 16. Thus, when the defective entity of the sub Dir. X is recovered, the management information is collectively placed in the SMA-2 area 16.

Since the structure of the drive apparatus according to the second embodiment is the same as that shown in FIG. 10, the description will be omitted.

Third Embodiment

According to a third embodiment, if a defect takes place in information that designates a record location of entity data of a file, the information can be recovered.

Since a logical format of a disc shaped record medium, a format process, and a method for adding a sub Dir. or a file after a format process has been performed according to the third embodiment are the same as those according to the second embodiment, their description will be omitted.

First of all, an operation for backing up an FE of a file in the case that a sub Dir. or a file has been created will be described.

FIG. 16 is a schematic diagram for explaining the structures of an SMA-2 area and an SMA-3 area before a backup of a file entry of a child file is created according to the third embodiment.

FIG. 17 is schematic diagram showing a file identifier descriptor according to the third embodiment.

FIG. 18 is a schematic diagram for explaining a method for creating a backup of a file entry of a child file according to the third embodiment.

FIG. 19 is a schematic diagram showing a format of an implementation use according to the third embodiment.

Figure 16A:
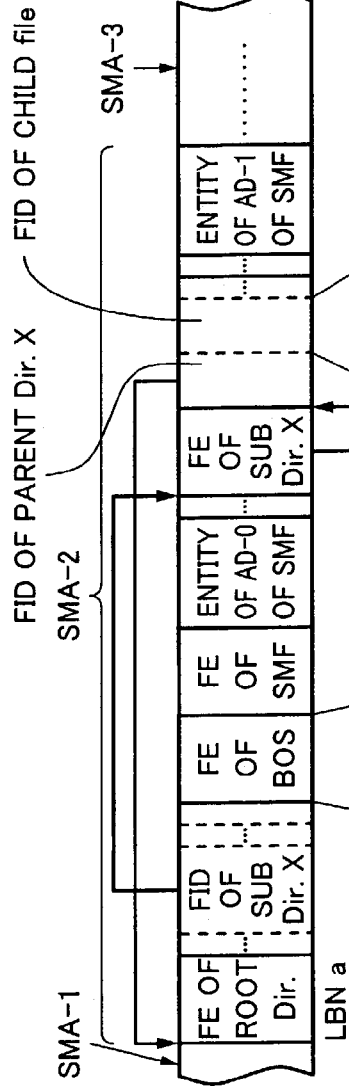
FIG. 16 is a schematic diagram for explaining the structures of an SMA-2 area and an SMA-3 area before a backup of a file entry of a child file is created according to a third embodiment.
Figure 16B:
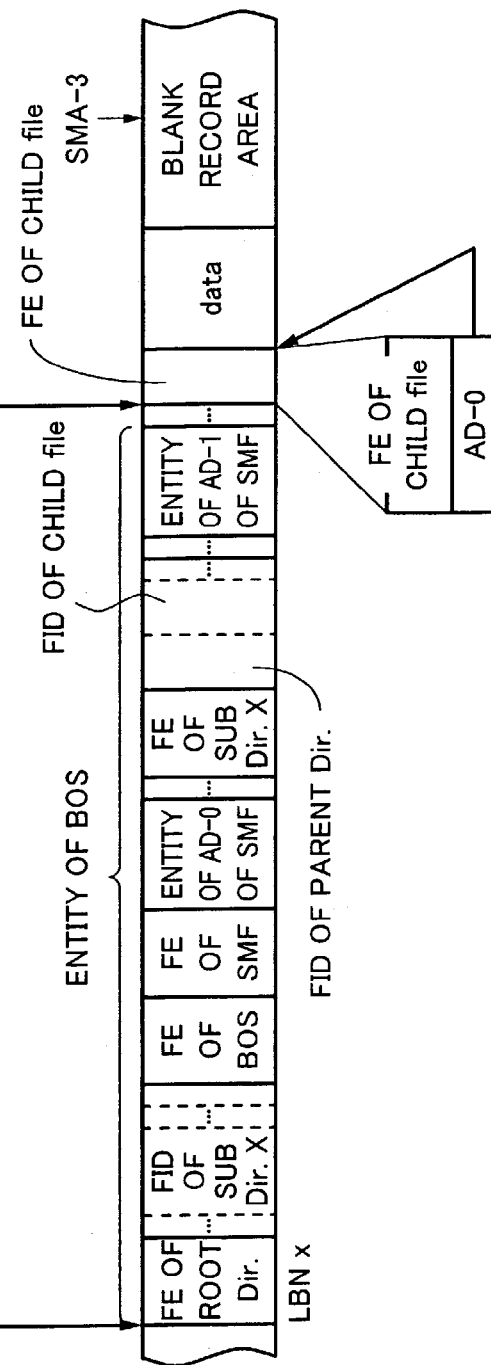

FIG. 16 is a schematic diagram showing a linear representation of a record area placed concentrically or spirally on a disc shaped record medium 10. FIG. 16A mainly shows an SMA-2 area 16. FIG. 16B mainly shows an SMA-3 area 17.

On the disc shaped record medium 10 shown in FIG. 16, by the operations according to the first embodiment and the second embodiment, a plurality of sub Dirs. are created under a root Dir. In addition, a sub Dir. and a file are created under another sub Dir. Sub Dir. X of the plurality of sub Dirs. is created under the root Dir. A child file is created under the sub Dir. X.

To create a sub Dir. and a file, as shown in FIG. 16A, an FE of the root Dir., an entity of the root Dir., an FE of a BOS, an FE of an SMF, an entity of an AD-0 of the SMF, FEs of plurality of sub Dirs., entities of the sub Dirs, and an entity of an AD-1 of the SMF are recorded in an SMA-2 area 16. The entity of the root Dir. is composed of an FID of a parent Dir., an FID of the SMF, an FID of the BOS, and FIDs of sub Dirs.

As shown in FIG. 16B, an SMA-3 area 17 is composed of an entity of the BOS, an FE of a file, entity data of the file, and a blank record area (in which substantially meaningful information has not been recorded). For example, a location of an FE of a child file in the sub Dir. X is stored in an ICB of an FID of the child file in the entity of the sub Dir. X. A location of entity data of the child file is stored in the AD-0 of the FE of the child file.

As shown in FIG. 17, in the UDF, the FID is composed of Descriptor Tag, File Version Number, File Characteristics, Length Of File Identifier, ICB, Length Of Implementation Use, Implementation Use, File Identifier, and Padding.

Next, the FID will be described in brief; for details, refer to the UDF Specification. The Descriptor Tag is an identifier that identifies a descriptor. Tag Identifier identifies a type of a descriptor. The File Version Number represents a version number of the file. The File Characteristics a file attribute that represents a hidden file, a not-hidden file, or a directory. The Length Of File Identifier represents the size (length) of a file ID. The ICB contains a logical address and a length of an FE (as was described above). The Length Of Implementation Use represents a lengththe Implementation Use. The Implementation Use will be described later. The File Identifier is an identifier of the file. The Padding is placed so that the FID, which has a variable length, becomes a multiple of four bytes.

As shown in FIG. 18, a BFE (Backed up File Entry) that is a backup of an FE of a child file is created in the SMA-3 area 17. When an FE of a regular child file is created, a spare BFE is created.

In FIG. 18, a BFE is recorded immediately after entity data designated thereby. Alternatively, a BFE may be recorded in any record area of the SMA-3 area 17.

The content of a BFE is the same as the content of an FE to be backed up. An AD-0 of the BFE contains a logical address and a length of entity data of a child file to be backed up.

To designate a BFE, the Implementation Use of the FID of the child file is extended.

As shown in FIG. 19, the Implementation Use is composed of Flag, Identifier, OS Class, OS Identifier, Implementation Use Area, and Logical Block Number of Backup BFE.

The Flag, Identifier, OS Class, OS Identifier, and Implementation Use Area comply with the standard of the UDF. The Logical Block Number Of Backup BFE is an extended portion according to the embodiment.

Next, the Implementation Use will be described in brief; for details, refer to the UDF Specification. The OS Class and the OS Identifier are cooperatively used. The OS Class and the OS Identifier represent an operating system (OS) on which the implementation (that is the entire apparatus including the drive apparatus) is operating. The Implementation Use Area is an area that the implementation can freely use.

The Logical Block Number of Backup BFE contains a location of a BFE that backs up a regular FE. The location of the BFE is represented by a logical block number.

The Implementation Use of the FID is also described in the Implementation Use of an FID of a child file in an entity of an BOS.

The UDF Specification is published on the home page of OSTA (Optical Storage Technology Association) (http://www.osta.org/html/ostaudf.html). Anyone can download the UDF Specification from the home page.

Next, an operation for recovering an FE of a regular child file placed in an SMA-3 area 17 in the case that the FE of the child file cannot be read will be described.

FIG. 20 is a schematic diagram for explaining a process for recovering a file entry of a child file in which a defect has taken place.

Figure 20A:
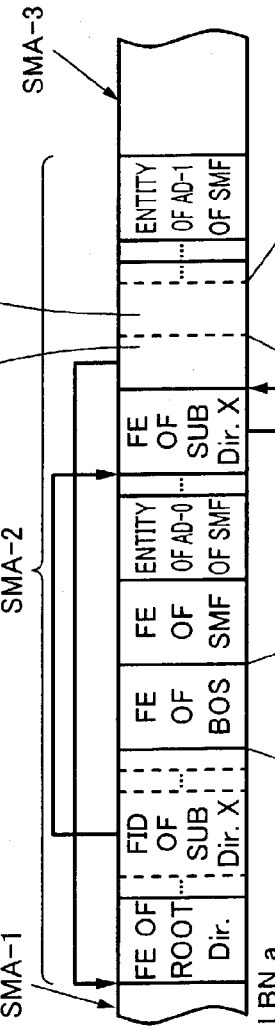
FIG. 20 is a schematic diagram for explaining a process for recovering a file entry of a child file in which a defect has taken place according to the third embodiment.
Figure 20B:
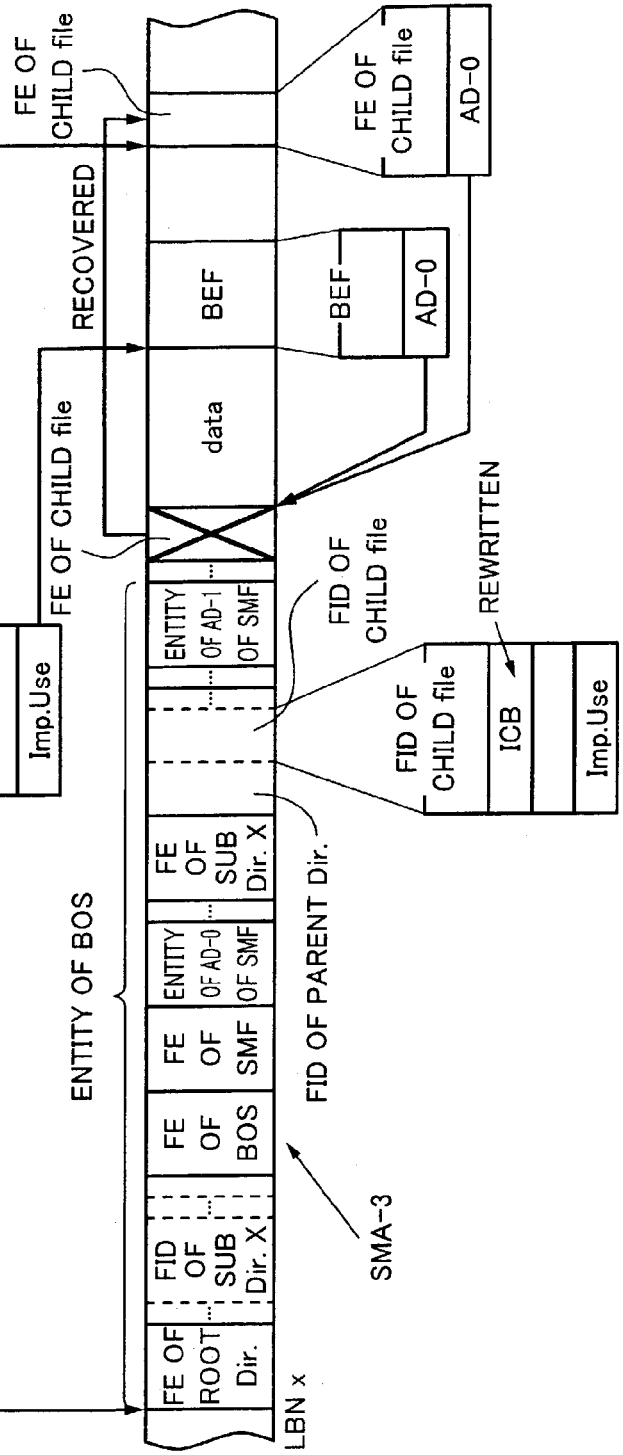

FIG. 20 is a schematic diagram showing a linear representation of a record area placed concentrically or spirally on a disc shaped record medium 10 according to the third embodiment. FIG. 20A mainly shows an SMA-2 area 16. FIG. 20B mainly shows an SMA-3 area 17.

In FIG. 20, an FID of sub Dir. X is placed in an entity of a root Dir. The FID of the sub Dir. X designates an FE of the sub Dir. X. The FE of the sub Dir. X designates an entity of the sub Dir. X. The entity of the sub Dir. X is composed of an FID of a parent Dir., an FID of a child file, and so forth. An ICB of the FID of the child file designates an FE of the child file.

In such a case, when the FE of the child file cannot be read due to a defect, the Implementation references the Implementation Use of the FID of the child file.

Next, the Implementation checks the Logical Block Number of Backup of the Implementation Use and obtains a logical block number of the backup BFE.

Next, the Implementation references the BFE with the logical block number thereof and copies the content of the BFE to a blank record area of the SMA-3 area 17. As a result, the Implementation recovers the FE of the regular child file.

Next, to designate the FE of the recovered child file, the Implementation rewrites the content of the ICB of the FID of the child file in the SMA-2 area 16.

Next, to reflect the rewritten content of the ICB, the Implementation rewrites the content of the FID of the child file of the entity of the BOS of the SFA 17.

Thus, the FE of the recovered child file is newly linked. With the FID of the child file, the recovered FE of the child file is referenced. As a result, entity data of the child file can be read. Even if some defect takes place in the FID of the child file, with reference to the FID of the child file in the entity of the BOS, the FID of the child file is recovered. In addition, the recovered FID of the child file designates the recovered FE of the child file.

In addition, whenever an FE of a regular child file cannot be read, with a backup BFE, the FE of the regular child file is recovered. Thus, unless both the FEs cannot be read, entity data of the file can be read.

When there are a plurality of files, there are also a plurality of BFEs. However, these BFEs may be treated as one file. In this case, an FID of the file for the BFEs is created in the entity of the root Dir. An FE that designates these BFEs is created in the SMA-2 area 16. Since the BFEs are treated as a file, an operating system that does not support the BFEs cannot use a backup function for an FE of a file. However, the disc shaped record medium 10 can be treated as a record medium that complies with the conventional UDF. When a file attribute of a BFE is designated, "hidden file attribute" is designated in the FID of the BFE. "Read only file attribute" and "system file attribute" are designated in the FE of the BFE.

Since the structure of the drive apparatus according to the third embodiment is the same as the structure of the drive apparatus shown in FIG. 10, the description will be omitted.

In the forgoing embodiments, format data for the disc shaped record medium 10 is created by the ENC/DEC circuit 56. However, the present invention is not limited to such an example. The format data can be created by the drive controlling microcomputer 60. Alternatively, the format data may be supplied from the digital apparatus 71.

In the forgoing embodiments, the present invention is applied to drive apparatuses such as an optical disc drive apparatus and a magneto-optical disc drive apparatus. However, the present invention is not limited to such examples. In other words, the present invention can be applied to a record medium drive apparatus that allows data recorded on a record medium to be managed with predetermined management information, for example, a fixed drive apparatus such as a hard disk drive apparatus.

As was described above, according to the present invention, names, addresses, lengths, and so forth of Dirs. and files managed on a disc shaped record medium are collectively recorded in a predetermined area (SMA-2 area) thereof. Thus, these management information can be read at high speed.

In addition, according to the present invention, since information of an initial range of an area (a second entity of an SMF) that stores information with respect to a sub Dir. and a file under a root Dir. that are added after a format process is performed has been recorded on a disc shaped record medium, regardless of locations of an FE of the root Dir. and an FE of the SMF, the SMA-2 area can be designated.

In addition, according to the present invention, a blank area of an SMA-2 area is managed as a file. In addition, after a format process has been performed, when a sub Dir. and a file are added and then they are deleted, although a blank area takes place, it is managed as a part of a file. Thus, the another OS is prevented from writing the SMA-2 area.

In addition, according to the present invention, since a special attribute is designated to a file managed as a blank area of the SMA-2 area, another OS is prevented from deleting the file managed as the blank area.

Alternatively, according to the present invention, management information for managing the hierarchical structure of the file system is collectively recorded in a predetermined area as a particular file. In addition, since the management information is copied as a backup file, even if a defect takes place in a part of the original management information, the backup file can be recovered to a predetermined area of which a particular file is deleted. Thus, after a recovery from a defect, by reading the original management information rather than a backup file, the drive apparatus can recognize the hierarchical structure of the file system. In addition, when the drive apparatus is recovered from a defect, since the management information is collectively recorded in a predetermined area, the drive apparatus can read the management information at high speed.

In addition, according to the present invention, since information with respect to an initial location and an initial length of a particular file and information with respect to a current location and a current length of the particular file are recorded in a particular area, the drive apparatus can securely recognize a location and a length of the particular area.

In addition, according to the present invention, since a defective sector in which a defect has taken place is not excluded from a particular file that is managed, the defective sector can be prohibited from being accessed. Thus, a backup file can be securely created.

In addition, according to the present invention, when an SMA-2 area that has been allocated in a format process becomes full, by rewriting only information of a file managed as a blank area of the SMA-2 area, it can be extended.

Alternatively, according to the present invention, since information that designates a location of entity data of a file is dually recorded, the security of the information can be improved.

In addition, according to the present invention, when regular information cannot be read due to an occurrence of a defect, using backup information, the regular information can be newly recovered to the record medium. Thus, even if the regular information cannot be read, entity data of a file can be read.

In addition, according to the present invention, whenever regular information cannot be read, it is recovered with backup information. Thus, unless both the regular information and the backup information cannot be read, entity data of a file can be read.

The invention claimed is:

1. A recording method for recording data to a disc shaped record medium corresponding to a hierarchical file system, the method comprising the steps of:

recording management information for managing a hierarchical structure of the file system to a management information area of the disc shaped record medium;

treating an unused area of the management information area as a particular file;

recording information with respect to an initial location and an initial length of the particular file and information with respect to a current location and a current length of the particular file to the management information area; and wherein when a part of the management information is deleted, the management information is updated by adding information to the management information area relating to a location and a length of a blank portion of which the part of the management information has been deleted.

2. The recording method as set forth in claim 1, further comprising the steps of:

when the management information is added to the management information area, reducing a length of the particular file corresponding to the management information that is added and creating a blank portion of the management information area; and recording the management information that is added in the blank portion of the management information area.

3. The recording method as set forth in claim 1, further comprising the step of:

designating a hidden file attribute, a system file attribute, and a read only file attribute to the particular file.

4. The recording method as set forth in claim 1, further comprising the step of:

when the management information area runs out of an area to which the management information is newly added, designating a new particular file to an unused area of the disc shaped record medium, recording information with respect to an initial location and an initial length of the new particular file and information with respect to a current location and a current length of the new particular file to the management information area so as to extend an area of the particular file.

5. A recording apparatus that records data to a disc shaped record medium corresponding to a hierarchical file system, the apparatus comprising:

means for recording management information for managing a hierarchical structure of the file system to a management information area of the disc shaped record medium;

means for treating an unused area of the management information area as a particular file;

means for recording information with respect to an initial location and an initial length of the particular file and information with respect to a current location and a current length of the particular file to the management information area; and wherein when a part of the management information is deleted, the management information is updated by adding information to the management information area relating to a location and a length of a blank portion of which the part of the management information has been deleted.

6. A disc shaped record medium having a program recorded thereon on which data is recorded corresponding to a hierarchical file system, said program comprising the steps of:

recording management information for managing a hierarchical structure of the file system being recorded to a management information area of the disc shaped record medium;

treating an unused area of the management information area being treated as a particular file;

recording information with respect to an initial location and an initial length of the particular file and information with respect to a current location and a current length of the particular file being recorded to the management information area; and wherein when a part of the management information is deleted, the management information is updated by adding information to the management information area relating to a location and a length of a blank portion of which the part of the management information has been deleted.

* * * * *